United States Patent
Matsumoto

(10) Patent No.: US 6,504,993 B1
(45) Date of Patent: Jan. 7, 2003

(54) DVD RECORDING DEVICE AND RECORDING METHOD

(75) Inventor: Yoshiaki Matsumoto, Kanagawa (JP)

(73) Assignee: Nippon Columbia Co., Ltd., Tokyo (JP)

(*) Notice: Subject to any disclaimer, the term of this patent is extended or adjusted under 35 U.S.C. 154(b) by 0 days.

(21) Appl. No.: 09/247,812

(22) Filed: Feb. 11, 1999

(30) Foreign Application Priority Data

Feb. 12, 1998 (JP) ............................................. 10-046224

(51) Int. Cl.$^7$ ................................................. H04N 5/91
(52) U.S. Cl. ......................... 386/95; 386/126; 386/111; 386/125; 369/30.04
(58) Field of Search .......................... 386/125–126, 386/46, 95, 109, 111, 112, 124, 83, 98; 369/30.04, 30.09

(56) References Cited

U.S. PATENT DOCUMENTS

| | | | | |
|---|---|---|---|---|
| 5,745,645 A | * | 4/1998 | Nakamura et al. | 386/95 |
| 5,751,371 A | | 5/1998 | Shintani | |
| 5,844,595 A | * | 12/1998 | Blatter et al. | 386/83 |
| 5,905,845 A | * | 5/1999 | Okada et al. | 386/98 |
| 5,914,917 A | * | 6/1999 | Bae | 369/30.09 |
| 6,108,281 A | * | 8/2000 | Tozaki et al. | 386/126 |

FOREIGN PATENT DOCUMENTS

| | | |
|---|---|---|
| EP | 0 724264 A2 | 7/1996 |
| EP | 0 797205 A2 | 9/1997 |
| EP | 0 903738 A2 | 3/1999 |
| EP | 0 929072 A2 | 7/1999 |
| JP | 08-273304 | 10/1996 |
| JP | 10-208394 | 8/1998 |
| WO | WO 97/06531 | 2/1997 |
| WO | WO 97/46007 | 12/1997 |
| WO | WO 98/44508 | 10/1998 |
| WO | WO 99/38166 | 7/1999 |

OTHER PUBLICATIONS

"DVD–R: Recordable by the User", Kazuo Kuroda, Shoji Taniguchi and Eiji Muramatsu in Denshi Gijutsu, Aug., 1996, pp. 10–14.

* cited by examiner

*Primary Examiner*—Vincent Boccio
(74) *Attorney, Agent, or Firm*—Dickstein Shapiro Morin & Oshinsky LLP

(57) ABSTRACT

A DVD recording apparatus that can record the video data taken with a video camera directly on an optical disk in a format reproducible on a DVD video playback device without using an intermediate medium, wherein a controller instructs a data recording unit to secure a reserved area on a recording medium, instructs a data formatter to convert content data compressed by a data compressor into at least one video title set, instructs the data recording unit to sequentially record the video title sets in an area following the reserved area on the optical disk, and after the video title sets have been recorded, instructs the data formatter and the data recording unit to record a video manager behind the reserved area, and after the video manager has been recorded, instructs the data formatter and the data recording unit to record volume and file structure data in front portion of the reserved area.

12 Claims, 19 Drawing Sheets

DVD RECORDING DEVICE AND RECORDING METHOD

BACKGROUND OF THE INVENTION

1. Field of the Invention

The present invention relates to a technique for recording content data, such as video data, on an optical information recording medium, such as a DVD-R (Digital Versatile Disk-Recordable) or a DVD-RAM.

2. Description of Related Art

As a data compression technique for moving picture images, the MPEG (Moving Picture Image Coding Expert Group) system is well known. Moreover, the DVD video is well known as an optical disk that contains video data compressed by the MPEG2 data compression technique and navigation data showing the reproduction method of the video data. The logical format and the reproduction method of the DVD video are described in detail in Japanese Patent Application Laid-Open No. Hei 8-273304. These items have been selected to formulate the DVD Video Standard.

More specifically, data on DVD video is formed in volume and file structures, and the formats of volume and file structures are prescribed in Micro UDF (Universal Disk Format) and ISO (International Standard Organization) 9660. Information about the format of the volume and file structure (volume data, file structure data) is described in the management area provided in Micro UDF and ISO 9660.

The DVD-R is interoperable with the DVD video and is a write once read many type optical disk into which the user can record information. Detailed description about the DVD-R is given, for example, in "DVD-R: Recordable by the User" in Denshi Gijutsu (Electronics Technology), August, 1996 pp. 10–14.

SUMMARY OF THE INVENTION

According to the literature mentioned above, the DVD-R have the same logical format as that of the DVD video, and therefore information can be reproduced from a DVD-R in the same manner as with a DVD video disk. However, when a user records video data in a DVD-R, as shown in FIG. 19, he transfers video data, which is to be recorded on a DVD-R 109, from his video camera 101 or the like into a VTR 102. The video data sent to the VTR 102 is compressed by an MPEG encoder 103, and recorded as material data in memory 104. Then, a DVD authoring system 105 is used to edit the video data to generate a file of the same format as that of logical data in conformity with the DVD Video Standard, the file is temporarily recorded in a large-capacity intermediate medium 106, such as a tape device. After all necessary files are complete, a DVD formatter 107 is used to convert those files into the physical format in conformity with the DVD Video Standard, and the files are recorded in a DVD-R 109 by a cutting machine 108 as a recording device.

As has been described, in the conventional DVD-R, it is necessary to generate a file of the logical data format in conformity with the DVD Video Standard, temporarily record in a large-capacity intermediate medium, such as a tape device, then covert those files into the physical format in conformity with the DVD Video Standard, and record the files on a DVD-R. Therefore, the recording data requires at least twice as long as reproducing recorded data.

Description will be given of the reasons why the above-mentioned steps are required.

A data unit to be reproduced includes data pack strings each of which are obtained by compressing according to the MPEG format, content data including at least any of an audio signal, a main video signal and a sub picture signal, and dividing the content data into packets. The data unit further includes a navigation pack, which is placed at the head of the data pack string and contains reproduction information about the data pack string and navigation information describing the relation of the data unit with other data units. The content data is reproduced on the basis of navigation information.

A set of data units mentioned above is called a data cell. Data cells are reproduced successively in time series. Cell reproduction information concerning reproduction of data cells is written in a table outside data cells and is referred to at playback as navigation data.

A video stream includes at least one set of data cells and is called a video object (VOB). One or more video objects that have a common attribute is called a video object set (VOBS). Therefore, in an ordinary movie with one story, one video object corresponds to one video object set, and one video stream concludes with one video object set. Video title set information (VTSI), which describes information for use in reproducing a video object set and attribute information, and a backup of video title set information (VTSI_BUP) are respectively arranged before and after the video object set, and those items of information constitute a video title set (VTS).

A maximum of 99 video title sets can be placed on a DVD-R, and a video manager (VMG) that describes information for managing the video title sets is arranged just before a group of video title sets.

As is understood from the foregoing, video title set information (VTSI) as navigation data for a video object set is undetermined until the end of recording of a video object set. A video manager for managing the respective video title sets is undetermined until recording of all video title sets is finished. Volume and file structure data for managing the contents on the disk as files and directories is undetermined until all data are recorded on the disk are determined.

On the contrary, according to the DVD Video Standard, the video manager, the volume and file structure data are recorded in the leading portion (more specifically, the inner circumference portion) of a recordable user area on the disk. For this reason, when video data is recorded on a DVD-R, as shown in FIG. 19, from compressed data to be recorded, files are generated in the logical data format in conformity with the DVD Video Standard, and are temporarily recorded in a large-capacity intermediate medium 106, such as a tape device. After all files are complete, in other words, after it has become possible to determine a video manager and volume and file structure data, it is necessary for the DVD formatter 107 to perform sectoring and modulation according to the physical format in conformity with the DVD Video Standard, and the cutting machine 108 sequentially records data starting from the inner circumference portion of the DVD-R 109.

As described above, until all video title sets to be recorded on the DVD-R are determined, a video manager is not determined and cannot be recorded. A DVD-R without a video manager recorded thereon cannot be played on the DVD video reproducing device. Therefore, with a current DVD-R, it is impossible to record TV programs or commemorative pictures and reproduce them immediately afterwards as we do with a video tape recorder (VTR) or a video-movie.

The present invention has been made with the above problem in mind and has as its object to enable the pictures taken with a video camera to be directly recorded on an optical recording medium (optical disk), such as a DVD-R in a format reproducible on a DVD video reproducing device without using an intermediate medium. Another object is to enable a scene to be recorded in such a way that discontinuity does not occur when it is reproduced.

To solve the above problem, according to the present invention, there is provided a DVD recorder for recording content data including any of input main video signal, sub picture signal, and audio signal on an optical information recording medium in a recording format in conformity with the DVD Video Standard, the DVD recorder comprising:

data compression means for compressing the content data at a fixed data compression rate;

data formatting means for adding reproduction information for the content data and navigation data showing the relation with other content data to the content data compressed by the data compression means, and converting the content data into a format in conformity with the DVD Video Standard;

data recording means for recording on an optical information recording medium the content data converted into a format in conformity with the DVD Video Standard by the data formatting means; and control means for centrally controlling the respective means, wherein the control means includes:

reserved area securing instruction means for instructing the data recording means to secure a reserved area having a predetermined capacity on the optical information recording medium;

video title set recording instruction means for instructing the data formatting means to convert the content data compressed by the data compression means into at least one video title set, including a video object set and video title set information describing information for reproducing the video object set and describing attributes information, and also for instructing the data recording means to sequentially record at least one video title set, obtained by the conversion, in the area following the reserved area on the optical information recording medium;

video manager recording instruction means for instructing the data formatting means to generate a video manager for managing the video title sets recorded on the optical information recording medium in accordance with the DVD Video Standard, and also for instructing the data recording means to record the video manager in the rear portion of the reserved area after the video title sets have been recorded on the optical information recording medium as instructed by the video title set recording instruction means; and volume and file structure data recording instruction means for instructing the data formatting means to generate volume and file structure data as information for managing contents on the optical information recording medium as files and directories in accordance with the DVD Video Standard, and also for instructing the data recording means to record the volume and file structure data in a front portion of the reserved area after the video manager has been recorded on the optical information recording medium as instructed by the video manager recording instruction means.

According to the present invention, a reserved area is previously secured on an optical information recording medium, content data compressed at a fixed compression rate is converted into at least one video title set in accordance with the DVD Video Standard, and the video title sets obtained by the conversion are sequentially recorded in the area following the reserved area. After the end of recording, lead-out data is recorded in a lead-out area, a video manager is recorded in the rear portion of the reserved area, and volume and file structure data is recorded in the front portion of the reserved area. Finally, lead-in data is recorded in the lead-in area.

By recording as mentioned above, it becomes possible to directly record a video title set on an optical information recording medium before a video manager and volume and file structure data are determined. Therefore, according to the present invention, pictures taken by a video camera can be recorded directly on an optical information recording medium, such as a DVD-R, in a format in conformity with the DVD Video Standard without using an intermediate medium.

Meanwhile, in the present invention, the above-mentioned video title set recording instruction means may be configured to instruct the data formatting means to convert the content data compressed by the data compression means into at least one video title set having a predetermined capacity, and also instruct the data recording means to sequentially record at least one video title set, obtained by the conversion, in the area following the reserved area on the optical information recording medium. In this case, the video title set recording instruction means preferably instructs the data recording means to record content data in one video title set as a single data cell.

With the above arrangement, it becomes possible to determine video title set information before a video object set is recorded, so that video title set information and a video object set can be recorded in this order on the optical information recording medium, and thus a video title set is recorded.

In the present invention, the video title set recording instruction means may include video title set information area securing means for instructing the data recording means to secure a video title set information reserved area of a predetermined capacity in the front portion of each video title set area when a video title set is recorded; data cell recording means for instructing the data recording means to record at least one data cell of a predetermined capacity in the area following the video title set information reserved area; and video title set information recording means for instructing the data recording means to record video title set information in the video title set information reserved area after data cells have been recorded on the optical information recording medium by the data cell recording means. In this case, the video title set recording instruction means preferably instructs the data recording means to record a video title set with a plurality of data cells, each having a predetermined capacity, included in it.

With this arrangement, it is possible to start recording on an optical information recording medium a video object set corresponding to a video title set information before the video title set information is determined. Because a video title set of any desired length can be used, one scene can be accommodated in one video title set. Therefore, one scene can be recorded in such a way that the scene does not discontinue at playback.

In the present invention, the control means may further comprise:

lead-out data recording instruction means for instructing the data formatting means to generate lead-out data in accordance with the DVD Video Standard, and also for instructing the data recording means to record the lead-out data in a lead-out area following the recorded area of the video title set on the optical information recording medium after video title sets have been recorded on the optical information recording medium by the video title set recording instruction means and before the video manager recording means starts recording a video manager on the optical information recording medium;

zero data recording instruction means for instructing the data formatting means and the data recording means to record zero data between the front portion of the reserved area on the optical information recording medium where the volume and file structure data was recorded and the rear portion of the reserved area where the video manager was recorded after volume and file structure data has been recorded on the optical information recording medium as instructed by the volume and file structure data recording instruction means; and lead-in data recording instruction means for instructing the data formatting means to generate lead-in data in accordance with the DVD Video Standard, and also for instructing the data recording means to record the lead-in data in the lead-in area on the optical information recording medium after zero data has been recorded on the optical information recording medium by the zero data recording instruction means.

In this case, the control means may further include:

program memory area securing means to instruct the data recording means to secure a program memory area at a location further in than the lead-in area or at a location further out than the lead-out area;

information recording instruction means for instructing the data recording means to record information concerning the video title set in the program memory area each time a video title set has been recorded; and data generating instruction means for instructing the data formatting means to generate the volume and file structure data and the lead-in data by referring to information recorded in the program memory area after the final video title set has been recorded.

DETAILED DESCRIPTION OF THE PREFERRED EMBODIMENTS

Description will be given of preferred embodiments of the present invention, starting with a first embodiment.

Figure 1:
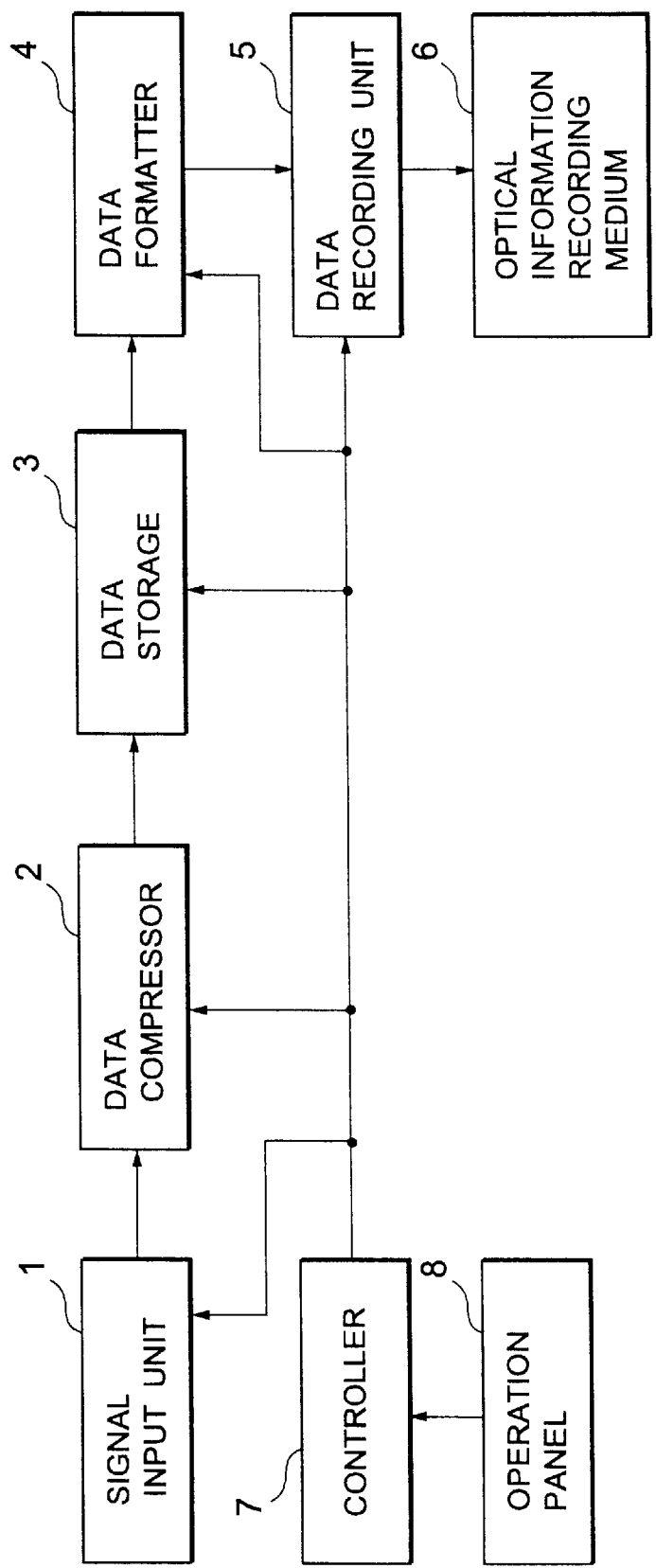
FIG. 1 is a schematic block diagram of a DVD recording device to which a first embodiment of the present invention is applied.

FIG. 1 is a schematic functional block diagram of a DVD recording device to which a first embodiment of the present invention is applied.

As shown in FIG. 1, a DVD recording device according to the first embodiment comprises a signal input unit 1 for receiving content data including at least any of the main video signal, sub picture signal and audio signal; a data compressor 2 for compressing the content data input into the signal input unit 1 at a fixed compression rate; a data storage 3 for storing the content data compressed by the data compressor 2; a data formatter 4 for adding reproduction information for the content data and navigation data indicating the relation with other content data to the content data stored in the data storage 3 and converting the content data into data having a format in conformity with the DVD Video Standard; a data recording unit 5 for recording the content data converted into the format in conformity with the DVD Video Standard by the data formatter 4 on an optical information recording medium 6, such as a DVD-R; a controller 7 for centrally controlling the signal input unit 1, the data compressor 2, the data storage 3, the data formatter 4, and the data recording unit 5; and an operation panel 8 for accepting command information that is input into the control unit 7.

Figure 2:
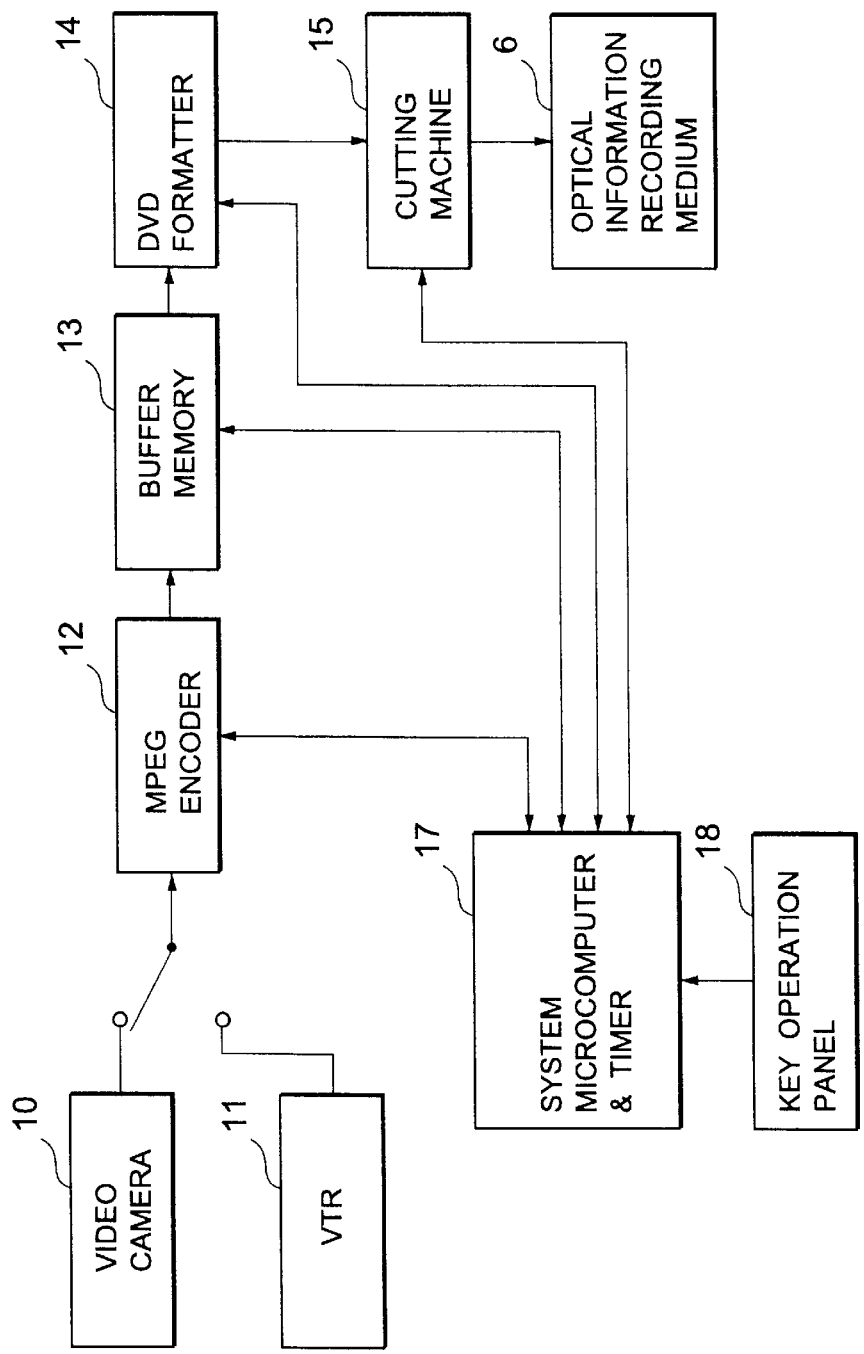
FIG. 2 is a schematic block diagram showing an example of the hardware configuration of the DVD recording device depicted in FIG. 1.

FIG. 2 is a schematic block diagram showing a hardware configuration of the DVD recording device shown in FIG. 1.

In FIG. 2, when video data is recorded on a DVD-R as an optical information recording medium 6, the video data from a video camera 10 or a VTR 11 is first compressed by an MPEG encoder 12 and stored in a buffer memory 13. Then, the video data stored in the buffer memory 13 is converted into data having a format in conformity with the DVD Video Standard by a DVD formatter 14, and recorded on an optical information recording medium 6 by a cutting machine 15. A system microcomputer/timer 17 controls the MPEG encoder 12, the buffer memory 13, the DVD formatter 14, and the cutting machine 15 to enable recording as mentioned above. A key operation panel 18 accepts command information to be input to the system microcomputer/timer 17.

In the hardware configuration shown in FIG. 2, the video camera 10 and the VTR 11 correspond to the signal input unit 1 in FIG. 1. The MPEG encoder 12, the buffer memory 13, the DVD formatter 14, the cutting machine 15, the system microcomputer/timer 17, and the key operation panel 18 correspond respectively to the data compressor 2, the data storage 3, the data formatter 4, the data recording unit 5, the controller 7, and the operation panel 8 in FIG. 1.

Figure 3:
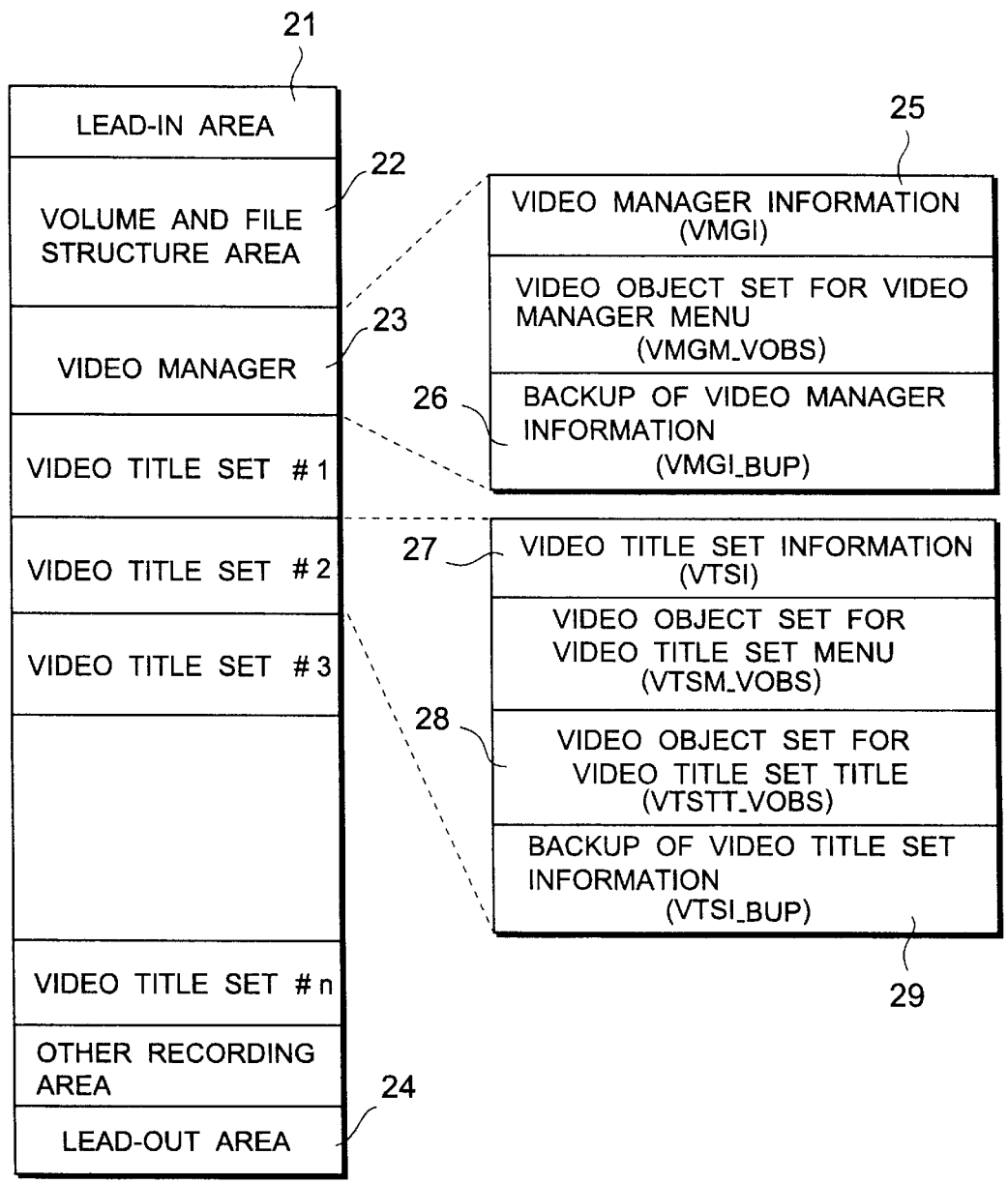
FIG. 3 is a diagram showing a logical structure of an optical information recording medium (optical disk) that can be played on a DVD video reproducing device (DVD video player)

FIG. 3 is a diagram showing a logical structure of an optical information recording medium (optical disk) that can be played on an ordinary DVD video reproducing device (DVD video player).

As shown in FIG. 3, the optical information recording medium of this kind includes at least a lead-in area 21, a volume and file structure area 22, a video manager (VMG) 23, video title sets #1 to #n, and a lead-out area 24.

The video manager (VMG) 23 includes at least a video manager information (VMGI) 25, and a backup of video manager information (VMGI_BUP) 26. The video manager (VMG) 23 may further include a video object set for video manager menu (VMGM_VOBS) as an option.

Each of video title sets #1 to #n includes at least video title set information (VTSI) 27, a video object set for video title set title (VTSTT_VOBS) 28, and a backup of video title set information (VTSI_BUP) 29. Each video title set #1 to #n may further include a video object set for a video title set menu (VTSM_VOBS) as an option.

Figure 4:
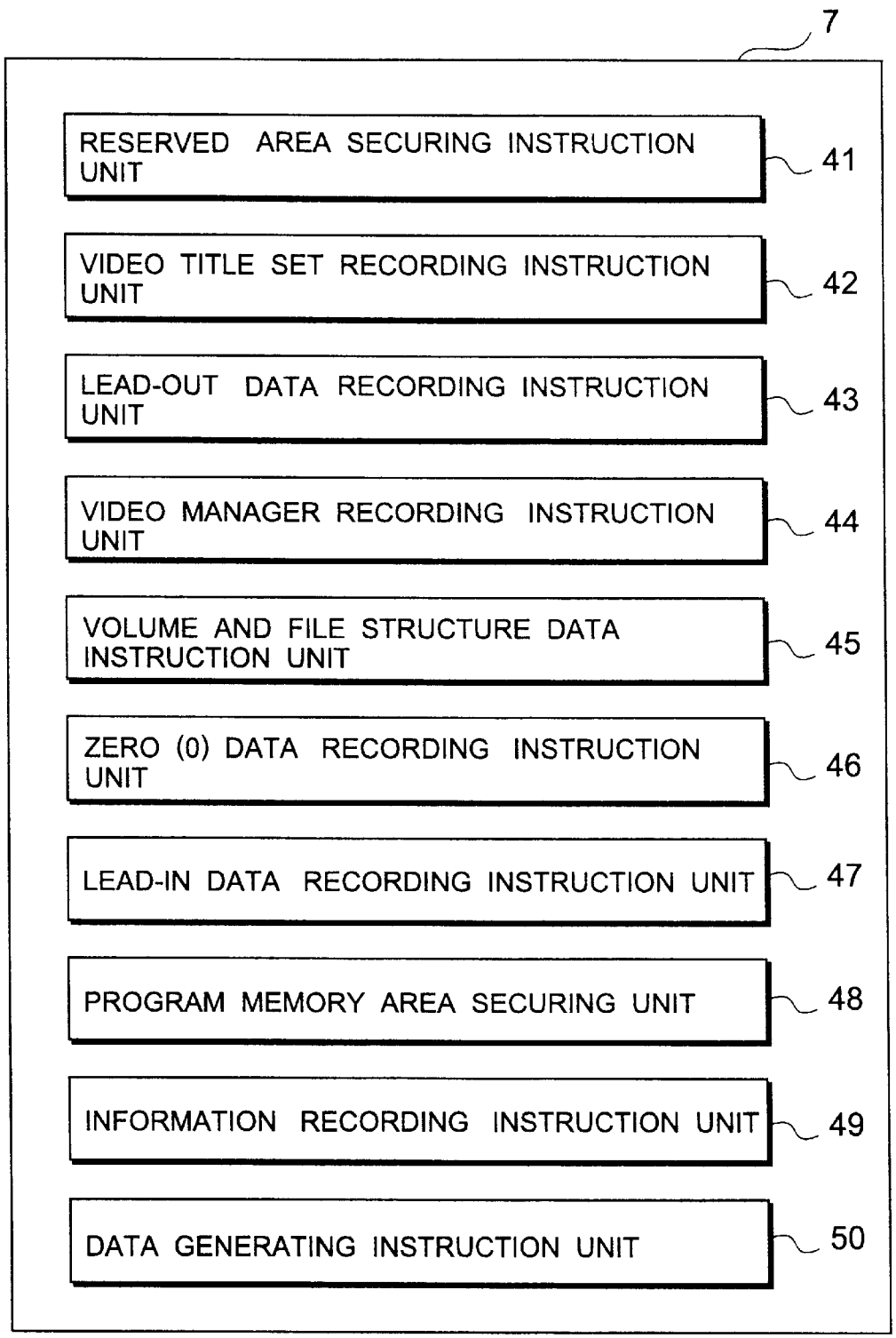
FIG. 4 is a schematic block diagram showing a structural example of the controller depicted in FIG. 1.

FIG. 4 is a schematic block diagram showing a structural example of the controller 7 shown in FIG. 1.

A reserved area securing instruction unit 41 instructs the data recording unit 5 to secure a reserved area with a predetermined capacity in the area following the lead-in area 21 of an optical information recording medium 6.

A video title set recording instruction unit 42 instructs the data formatter 4 to convert, in compliance with the DVD Video Standard, content data compressed by the data compressor 2 and stored in the data storage 3 into at least one of video title sets #1 to #n, each placed in a predetermined capacity and including a video object set and video title set information describing information for reproducing the video object set and attributes information, and also instructs the data recording unit 5 to sequentially record the video title sets #1 to #n, produced by the conversion, in the area following the reserved area on the optical information recording medium 6. In the first embodiment, the video title set recording instruction unit 42 instructs the data recording unit 5 to record the content data in one video title set as a data cell.

A lead-out recording instruction unit 43 instructs the data formatter 4 to generate lead-out data in conformity with the DVD Video Standard, and also instructs the data recording unit 5 to record the generated lead-out data in the lead-out area 24 which follows the recorded area of the video title set on the optical information recording medium 6 after the video title sets #1 to #n have been recorded on the optical information recording medium 6 as instructed by the video title set recording instruction unit 42.

A video manager recording instruction unit 44 instructs the data formatter 4 to generate a video manager 23 for managing the video title sets recorded on the optical information recording medium 6 in conformity with the DVD Video Standard and also instructs the data recording unit 5 to record the generated video manager 23 in the rear portion of the reserved area, which was secured by the reserved area securing instruction unit 41, after lead-out data has been recorded on the optical information recording medium 6 as instructed by the lead-out recording instruction unit 43.

A volume and file structure data recording instruction unit 45 instructs the data formatter 4 to generate, in conformity with the DVD Video Standard, volume and file structure data 22 for managing contents on the optical information recording medium 6 as files and directories, and also instructs the data recording unit 5 to record the volume and file structure data 22 in the front portion of the reserved area, which was secured by the reserved area securing instruction unit 41, after the video manager 23 has been recorded on the optical information recording medium 6 as instructed by the video manager recording instruction unit 44.

A zero data recording instruction unit 46 instructs the data formatter 4 and the data recording unit 5 to record zero (0) data between the front portion of the reserved area on the optical information recording medium 6, secured by the reserved area securing instruction unit 41, where volume and file structure data 22 was recorded, and the rear portion of the reserved area where the video manager 23 was recorded after the volume and file structure data 22 has been recorded on the optical information recording medium 6 as instructed by the volume and file structure data recording instruction unit 45.

A lead-in data recording instruction unit 47 instructs the data formatter 4 to generate lead-in data in accordance with the DVD Video Standard, and also instructs the data recording unit 5 to record the lead-in data in the lead-in area 21 on the optical information recording medium 6 after zero data has been recorded on the optical information recording medium 6 as instructed by the zero data recording instruction unit 46.

A program memory area securing unit 48 instructs the data recording unit 5 to secure a program memory area at a location further in than the lead-in area 21 or at a location further out than the lead-out area 24.

An information recording instruction unit 49 instructs the data recording unit 5 to record information obtained when video title sets #1 to #n are recorded in the program memory area.

A data generating instruction unit 50 instructs the data formatter 4 to generate the volume and file structure data 22 and the lead-in data by referring to information recorded in the program memory area after the final video title set #n has been recorded.

Figure 5:
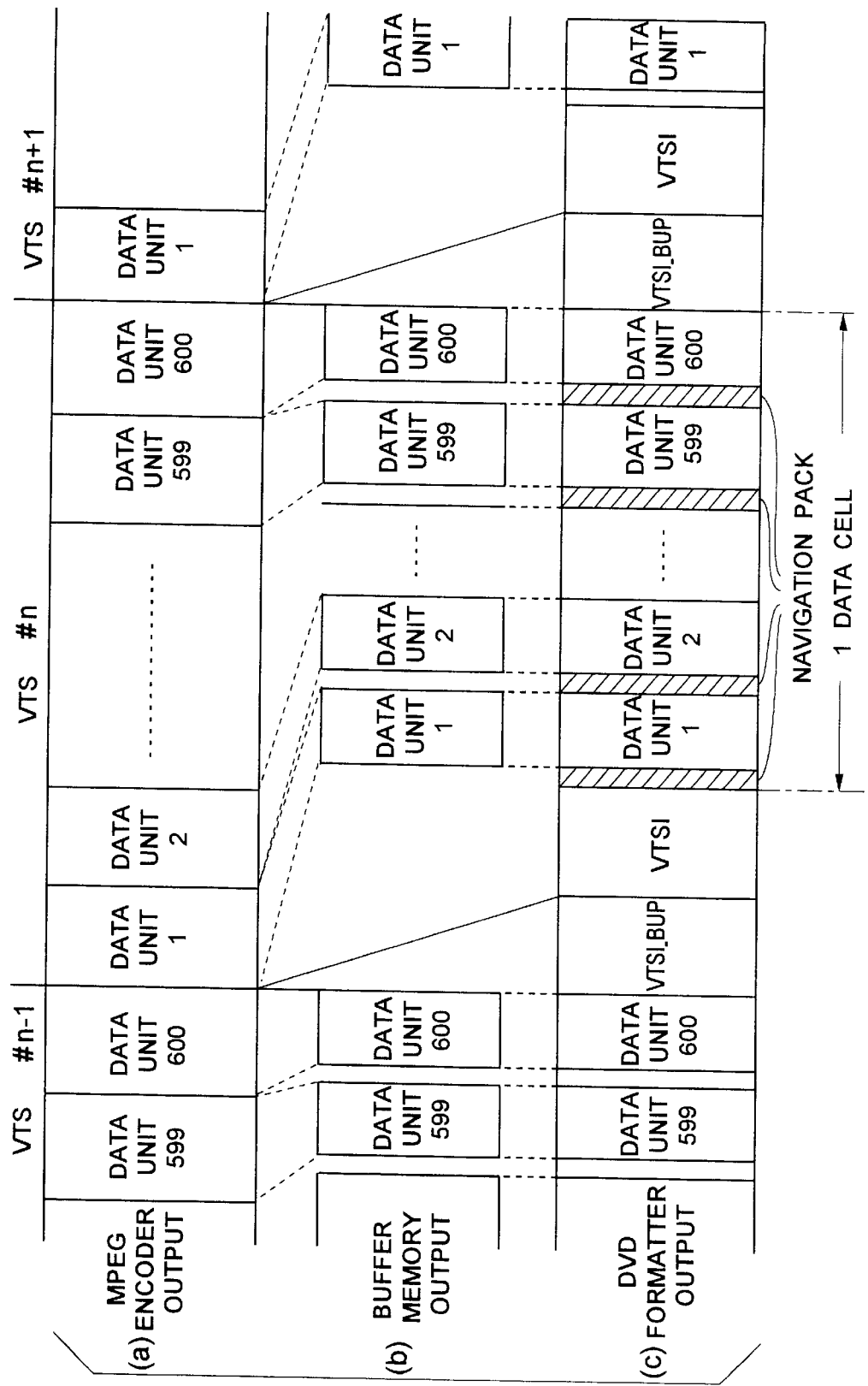
FIG. 5 is a diagram for explaining a procedure for recording on an optical information recording medium in a logical structure shown in FIG. 3, video data and audio data that can be reproduced on a DVD video reproducing device in the first embodiment of the present invention.
Figure 6:
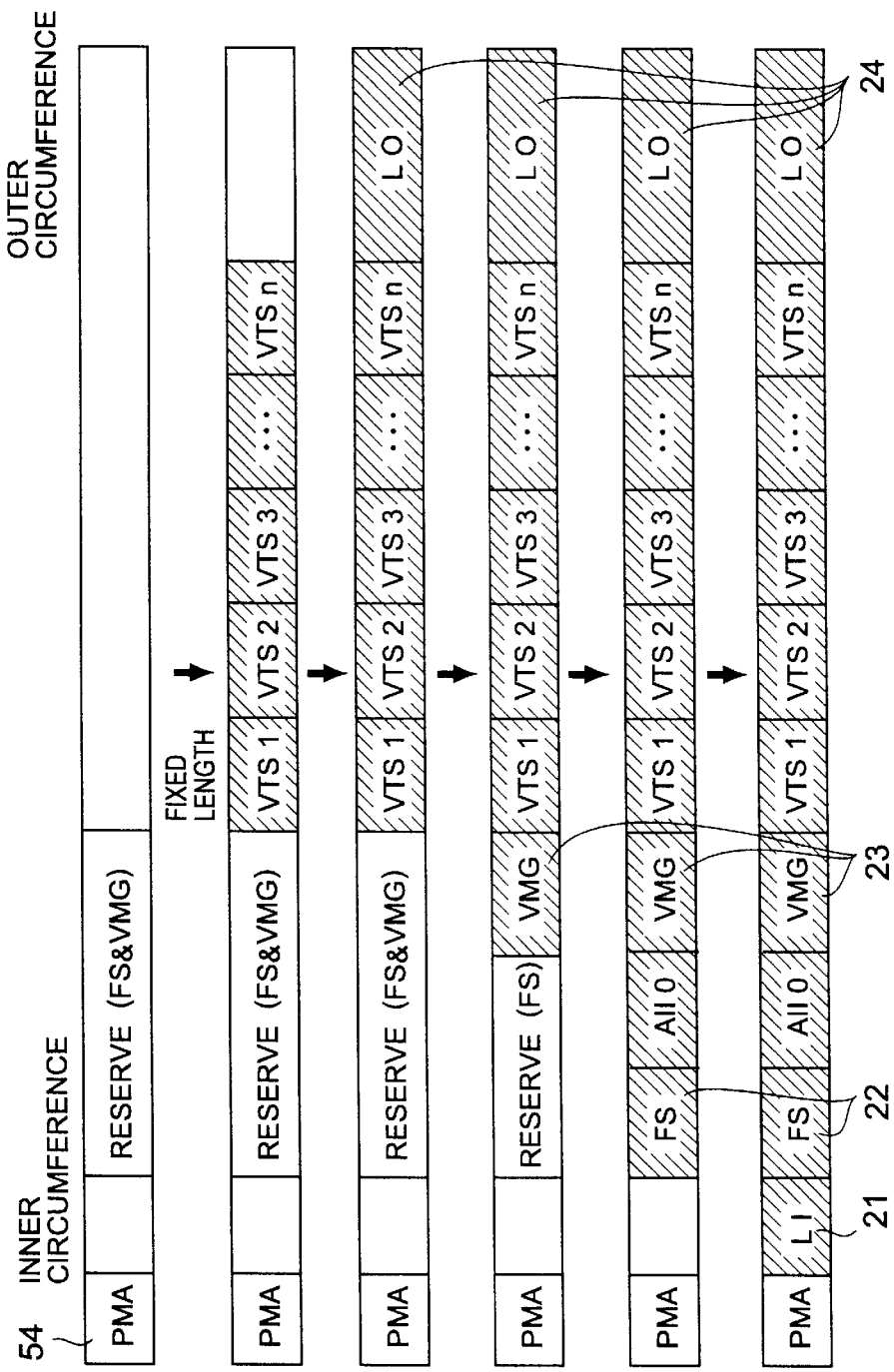
FIG. 6 is a diagram for explaining a procedure for recording on an optical information recording medium in the logical structure shown in FIG. 3, video data and audio data that can be reproduced on a DVD video reproducing device in the first embodiment of the present invention.

FIGS. 5 and 6 are diagrams for explaining procedures for recording on an optical information recording medium 6 in the logical structure shown in FIG. 3, video data and audio data in conformity with the DVD Video Standard, that is, data that can be reproduced on a DVD video reproducing device (DVD video player) in the first embodiment of the present invention.

In the present embodiment, the optical information recording medium 6 is a write-once (WO) disk. A procedure for recording on the WO disk video and audio data that can be reproduced on a DVD video player will now be described.

Before recording, a lead-in area 21, as shown in FIG. 3, and a reserved area sufficient for recording volume and file structure data (FS) 22 and a video manager (VMG) 23 are secured on the WO disk in advance.

The capacity of the area to be secured is obtained as follows.

It is assumed that the total number n of video title sets (VTS) #1 to #n on the disk is 99 at maximum, and that there is one video manager 23 on the disk. It is also assumed that a video object set for video manager menu (VMGM_VOBS) and a video object set for video title set menu (VTSM_VOBS) are not recorded. In this case, it follows that the video title sets #1 to #n each include three files and that the video manager 23 includes two files. Therefore, the total number of files that can be recorded on the disk is given by the following equation.

$$2\times1+3\times99=299 \text{ files} \qquad \text{Eq. 1}$$

Because the largest number of files that can be recorded on a disk is known, it is possible to estimate a capacity required for recording the volume and file structure data 22 of the files.

The largest capacity of an area required for recording the video manager 23 descriptive of the pointers to and the attributes of the video title sets #1 to #n can be estimated from the largest number 99 of video title sets that can be recorded on the disk in advance.

When a lead-in area 21 and a reserved area for recording the volume and file structure data 22 and the video manager 23 are secured as described, recording of video title sets #1 to #n is started following the secured areas. At this time, in the procedure in FIG. 6, a recording (playback) time is determined in advance for all video title sets #1 to #n. A recording (playback) time is set at 5 minutes, for example. The recording compression rate (amount of information for a unit time) of video and audio data is fixed (fixed transfer rate) and a capacity required for recording for a unit time is fixed.

With the above arrangement, data pack reproduction information and navigation information (a navigation pack) descriptive of the relation with other data units, which is placed at the head of a data pack string of a data unit to be reproduced in a fixed time length, can be prepared (determined) in advance. Moreover, video title set information (VTSI) 27 descriptive of reproduction information for a video object set 28 as a set of data units and attributes information, and its backup (VTSI_BUP) 29 can be prepared (determined) in advance.

More specifically, a video title set information 27 describes a program chain information (PGCI) that specifies, for example, a method for connection to a program for reproducing a story of a title. It is assumed here that each video title set includes one program chain (PGC), each program chain includes one program, and each program includes one data cell. The reproduction time (recording time) of each data cell is set to be 5 minutes in this example.

If the recording time of each data unit is fixed at 0.5 seconds (15 frames at field frequency of 60 Hz), the number of data units included in each data cell is as follows.

$$\text{Number of data units}=5\times60/0.5=600 \qquad \text{Eq. 2}$$

If 1 data unit is denoted as 1 GOP (Group of Pictures) as provided in MPEG2 and if each of the numbers of I-pictures (intra-coded pictures), P-pictures (predictive-coded pictures) and B-pictures (bi-directionally predictive-coded pictures) are fixed regardless of variation of input video data, the data capacity (number of bytes) for each data unit can be made constant.

Under these conditions, recording of data on the WO disk is started. The DVD recording device, schematically shown in FIG. 2, which embodied the functional configurations indicated in FIGS. 1 and 4, carries out recording by following the procedures as shown in FIGS. 5 and 6.

First of all, the MPEG encoder 12 compresses video data from a video camera 10 or a VTR 11 at a fixed compression rate (1/70, for example).

In FIG. 5(a), stream data (data units) compressed and output from MPEG encoder 12 is shown. For example, if we pay attention to a video title set #n, we can see data units 1 to 600 output from MPEG encoder 12.

The stream data compressed and output as described above is stored in the buffer memory 13. As shown in FIG. 5(b), the buffer memory 13, after delaying the stream data output from MPEG encoder 12 for a fixed length of time (0.07 seconds, for example), compresses the data on the time base and outputs it to the DVD formatter 14. For example, if attention is paid to the video title set #n, it is understood that the data units 1 to 600 are delayed by a fixed length of time, then compressed on the time base, and output to the DVD formatter 14.

In the DVD formatter 14, as shown in FIG. 5(c), some items of navigation data are added to each data unit to convert it to data having a format that can be reproduced on a DVD video player. Therefore, the DVD formatter 14 outputs data units added with a navigation pack. For example, in the video title set #n, the data units 1 to 600 as a whole, each added with a navigation pack, constitute one data cell.

Consequently, when the DVD formatter 14 outputs the video title set #n, for example, the video title set #n is recorded on a DVD-R by the cutting machine 15. If recording continues longer than 5 minutes from the start of recording of the current video title set #n, recording is concluded with the current video title set #n, and recording is restarted with the next video title set #n+1.

If recording of the current video title set ends within 5 minutes from when it started, the remaining portion of the video title set is filled with black image data or a specific image data showing characters such as "No more information is recorded on this disk" until the reproduction time of the video title set amounts to 5 minutes.

When recording of the final video title set on the disk is finished, the finalizing step is performed on the disk.

In the finalizing step, as shown in FIG. 6, lead-out data (LO) 24 is recorded in the lead-out area, and a video manager 23 generated in accordance with the total number n of video title sets on the disk is recorded in the rear portion of the reserved area secured in advance. Then, volume and file structure data 22 regarding all data recorded on the disk is recorded in the front portion of the reserved area. Subsequently, an intermediate area between the recorded area of the volume and file structure data 22 and the recorded area of the video manager 23 is filled (recorded) with zero data. Finally, lead-in data (LI) 21 corresponding to the capacity of data recorded on the disk is recorded in the lead-in area. Thus, a disk that can be played on a DVD video player is completed.

Figure 7:
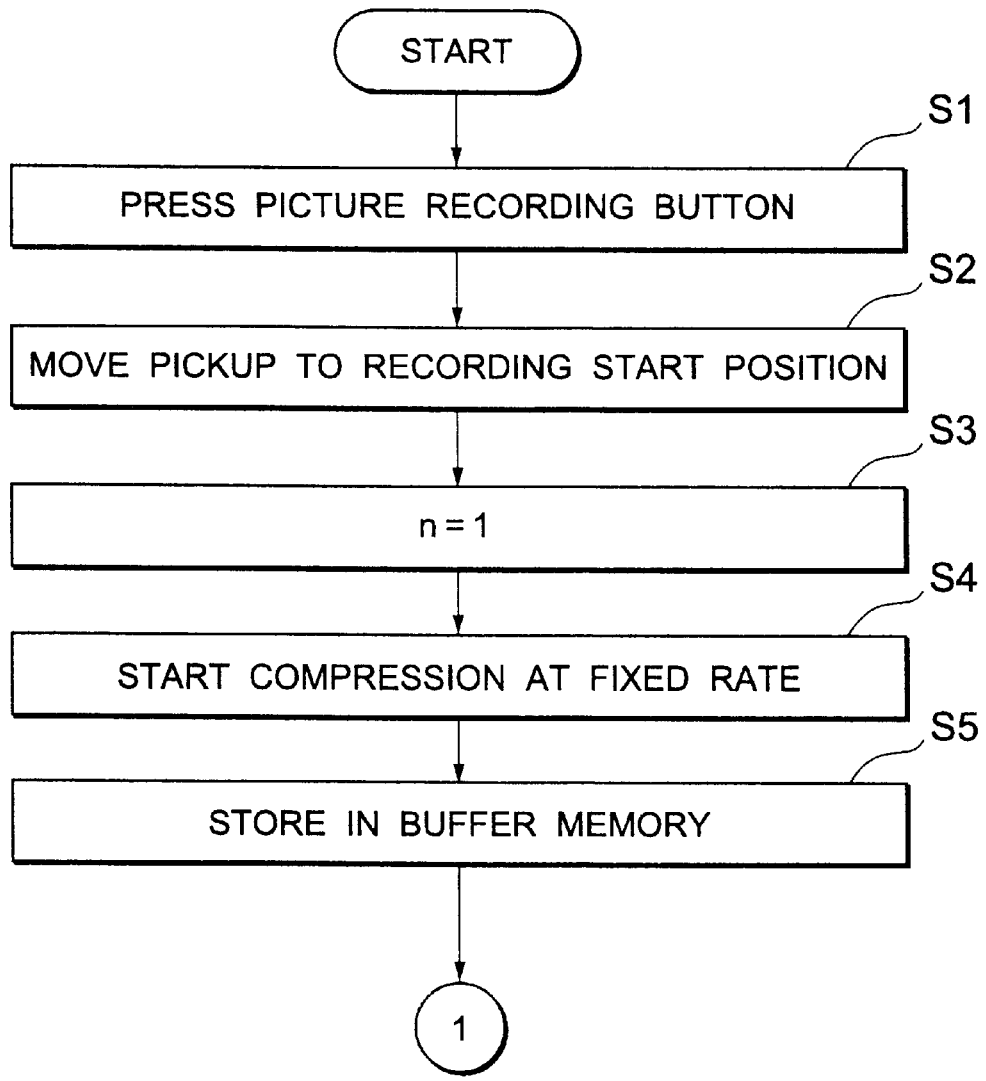
FIG. 7 is a flowchart for explaining a more detailed procedure for recording on an optical information recording medium in the logical structure shown in FIG. 3, video data and audio data that can be reproduced on a DVD video reproducing device in the first embodiment of the present invention.
Figure 8:
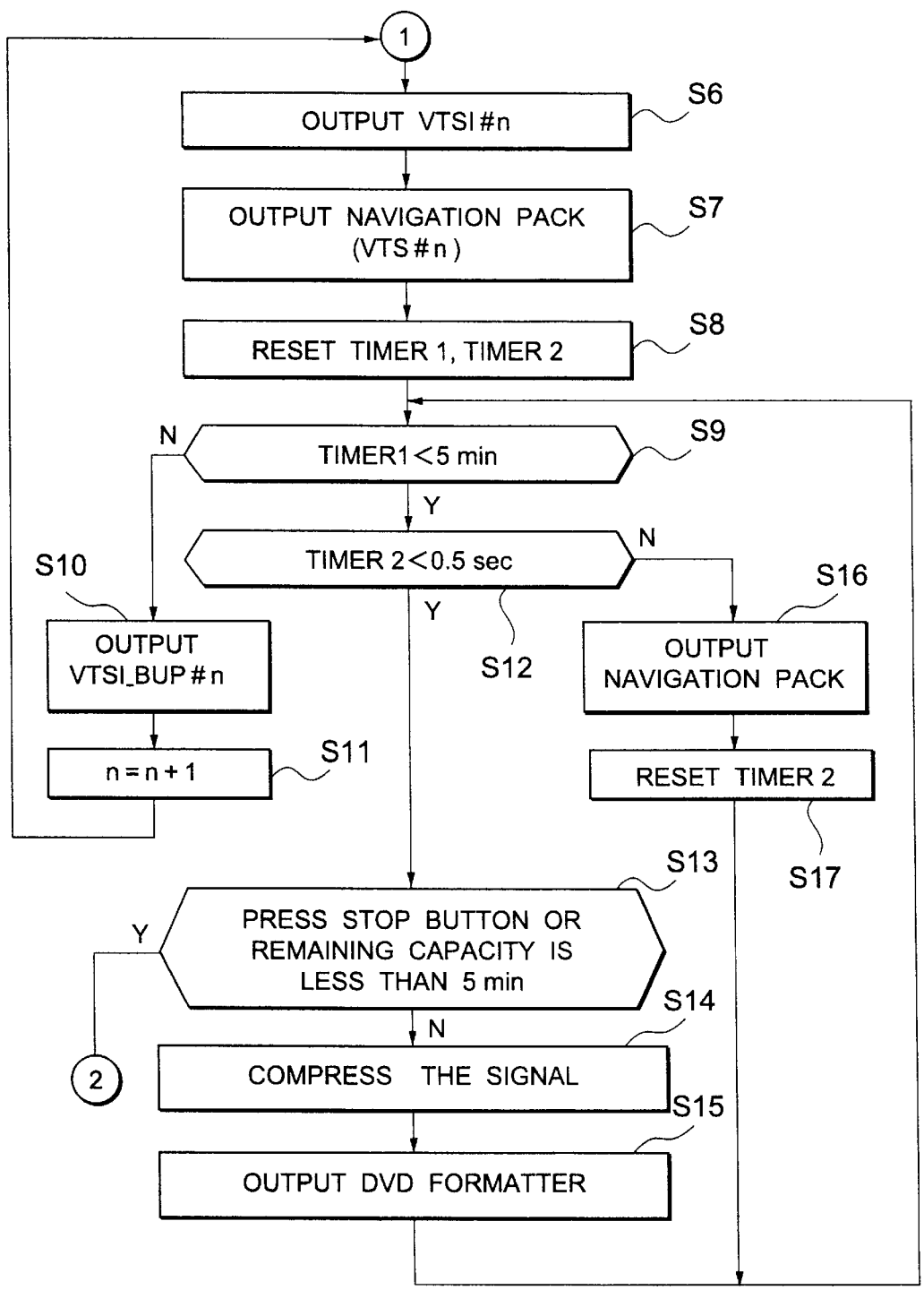
FIG. 8 is a flowchart for explaining a more detailed procedure for recording on an optical information recording medium in the logical structure shown in FIG. 3, video data and audio data that can be reproduced on a DVD video reproducing device in the first embodiment of the present invention.
Figure 9:
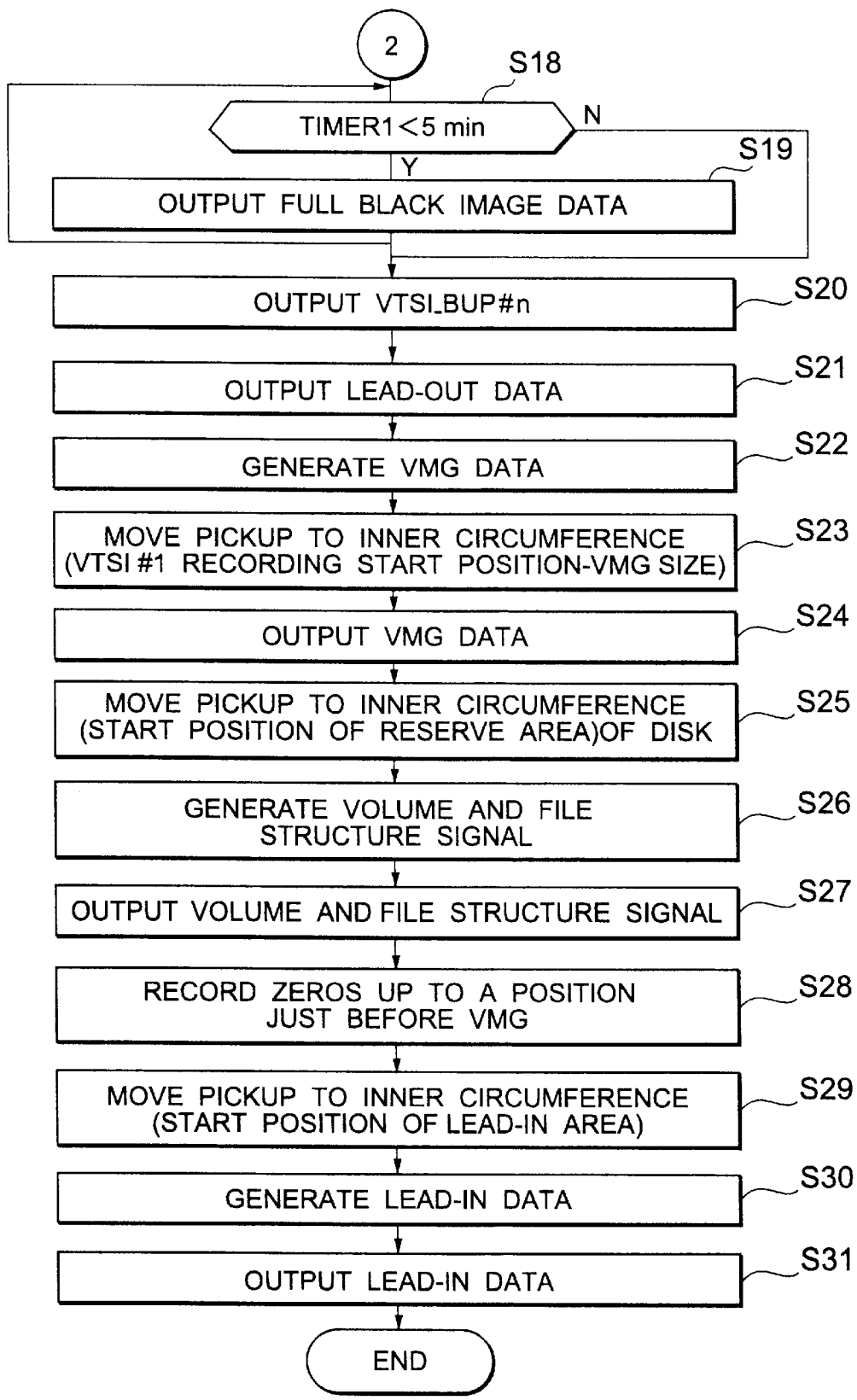
FIG. 9 is a flowchart for explaining a more detailed procedure for recording on an optical information recording medium in the logical structure shown in FIG. 3, video data and audio data that can be reproduced on a DVD video reproducing device in the first embodiment of the present invention.

FIGS. 7 to 9 show a flowchart for explaining a detailed procedure for recording on an optical information recording medium 6 in a logical structure shown in FIG. 3, video and audio data in conformity with the DVD Video Standard, that is, data that can be reproduced on a DVD video reproducing device (DVD video player). This flow of operations is performed by a DVD recording device, shown in FIG. 2, which embodied the functional configurations in FIGS. 1 and 4.

In the operational flow shown in FIGS. 7 to 9, there is a setting such that one video title set takes 5 minutes and that a specific image data inserted in a video title set is black image data when recording of the video title set ends within 5 minutes from when it started.

In FIG. 7, when the picture recording button on the key operation panel 18 is pressed (Step S1), the system microcomputer/timer 17 causes the pickup of the cutting machine 15 to be moved to the recording start position (Step S2). In other words, the pickup is moved to the next position of the reserved area secured in advance.

The system microcomputer/timer 17 initializes the video title set number counter's value n to "1" (Step S3). Subsequently, video (image) data output from a video camera 10 or a VTR 11 is input to MPEG encoder 12. In response, the MPEG encoder 12 starts compressing video data at a fixed rate (Step S4). The buffer memory 13 temporarily stores video data compressed by the MPEG encoder 12 as content data (Step S5).

In FIG. 8, when content data compressed by MPEG encoder 12 is stored in the buffer memory 13, the DVD formatter 14, in response to a command from the system microcomputer/timer 17, adds navigation data to the content data stored in the buffer memory 13, and starts work of converting the data into data having a format in conformity with the DVD Video Standard. First, video title set information of video title set #n is output (Step S6). Next, a navigation pack is output, which is to be added to the first data unit of video title set #n (Step S7). This video title set information and a navigation pack are recorded in this order on the disk by the cutting machine 15.

Then, the system microcomputer/timer 17 resets a timer 1 for counting passage of 5 minutes and a timer 2 for counting passage of 0.5 seconds, and causes those timers to start counting (Step S8).

After this, the system microcomputer/timer 17 decides whether or not the timer 1 has counted passage of 5 minutes (Step S9). If the timer 1 has counted passage of 5 minutes, this is notified to the DVD formatter 14. In response, the DVD formatter 14 outputs a backup of video title set #n information (VTSI_BUP) (Step S10), increments the counter's value n by one (Step S11), and returns to Step S6. The cutting machine 15 records the backup of video title set #n information next to the last data unit of the video title set #n.

On the other hand, at Step S9, if the timer 1 has not counted the passage of 5 minutes, the system microcomputer/timer 17 decides whether or not the timer 2 has counted the passage of 0.5 seconds (Step S12). If the timer 2 has counted the passage of 0.5 seconds, this is notified to the DVD formatter 14. In response, the DVD formatter 14 outputs a navigation pack to be added to a data unit next to the recorded data unit out of the data units constituting the video title set #n (Step S16). The cutting machine 15 records this data next to the recorded data unit. After this, the system microcomputer/timer 17 resets the timer 2 (Step S17), and returns to Step S9.

At Step S12, if the timer 2 has not counted the passage of 0.5 seconds, the system microcomputer/timer 17 decides whether or not the Stop button on the key operation panel 18 has been pressed, and decides whether or not the remaining capacity of the disk is smaller than a recording capacity corresponding to 5 minutes (Step S13). If the Stop button has not been pressed and the remaining capacity of the disk is greater than a recording capacity corresponding to 5 minutes, the DVD formatter 14 compresses the content data stored in the buffer memory 13 on the time base and outputs the content data to the cutting machine 15 from the buffer memory 13 (Step S14). In response, the cutting machine 15 records this content data as a data unit next to the navigation pack of the data unit already recorded (Step S15), and the process returns to Step S9.

When the system microcomputer/timer 17 at Step S13 decides that the Stop button has been pressed or the remaining capacity of the disk is smaller than a recording capacity corresponding to 5 minutes, the system microcomputer/timer 17 moves on to the flow of FIG. 9 and decides whether or not the timer 1 has counted the passage of 5 minutes (Step S18). If the timer 1 has not counted the passage of 5 minutes, the DVD formatter 14 outputs black image data (Step S19). The cutting machine 15 records the black image data as the rest of the data unit being recorded.

At Step S18, the above operation is repeated until the timer 1 counts the passage of 5 minutes. When the timer 1 has counted the passage of 5 minutes, the system microcomputer/timer 17 notifies this to the DVD formatter 14. In response, the DVD formatter 14 outputs a backup of the video title set #n information (Step S20), and outputs lead-out data (Step S21). The cutting machine 15 sequentially records those items of data next to the last data unit of the video title set #n.

After this, the DVD formatter 14 generates a video manager (Step S22).

Then, the system microcomputer/timer 17 causes the pickup of the cutting machine 15 to move to an inner circumference portion of the disk (Step S23). More specifically, the pickup is moved to a position (in the rear portion of the reserved area) distant by the size of the video manager from the recording start position of video title set information (VTSI) #1. The cutting machine 15 outputs the video manager from its pickup (Step S24), and records the video manager in the rear portion of the reserved area secured in advance.

Then, the system microcomputer/timer 17 causes the pickup of the cutting machine 15 to move to the inner circumference portion of the disk and further move to the front portion of the reserved area secured in advance (Step S25).

At this time, the DVD formatter 14 generates volume and file structure data (Step S26). The cutting machine 15 outputs the volume and file structure data from its pickup (Step S27). The cutting machine 15 records the volume and file structure data in the front portion of the reserved area secured in advance. After this, the cutting machine 15 records zero (0) data up to just in front of the video manager recorded previously (Step S28). Thus, the intermediate area between the front portion of the reserved area where the volume and file structure data was recorded and the rear portion where video manager was recorded is filled with zero data.

Then, the system microcomputer/timer 17 causes the pickup of the cutting machine 15 to move to the inner circumference portion of the disk and further move to the start position of the lead-in area (Step S29). At this time, the DVD formatter 14 generates lead-in data (Step S30), and the cutting machine 15 outputs the lead-in data from its pickup (Step S31). Thus, lead-in data is recorded in the lead-in area.

By the above process, when the optical information recording medium 6 is a WO disk, video data and audio data that can be reproduced on a DVD video player can be recorded directly on the WO disk.

The first embodiment of the present invention has been described.

In the disk recording method according to the first embodiment, a reserved area is previously secured subsequent to the lead-in area of the WO disk. Then, content data compressed at a fixed compression rate is divided into predetermined data lengths (a length corresponding to a recording time of 5 minutes in this example), and they are sequentially recorded in the area following the reserved area on the WO disk as video title sets #1 to #n. After the video title sets #1 to #n have been recorded, lead-out data of the WO disk is recorded in the lead-out area, the video manager is recorded in the rear portion of the reserved area secured previously, and the volume and file structure data is recorded in the front portion of the reserved area. Finally, lead-in data is recorded in the lead-in area.

More specifically, the reserved area is secured in advance following the lead-in area of the WO disk. Content data compressed at a fixed compression rate is recorded next to the reserved area in the form of video title sets #1 to #n of 5 minutes long each. The number of video title sets is increased to 99 at maximum according to a recording time of content data. After all content data has been recorded, lead-out data is recorded in an outer circumference portion of the disk. Then, a video manager is generated in accordance with the number of video title sets, and is recorded in the rear portion of the reserved area. Volume and file structure data is recorded in the management area (in the front portion of the reserved area) provided in Micro UDF and ISO9660, and the entire unused portion of the reserved area is filled with zero data. Finally, lead-in data is generated in accordance with the length (capacity) of the program area, and is recorded in the lead-in area, and with this, a recorded disk that can be played on a DVD video player is completed.

Note that on a disk before undergoing the finalizing step, it is possible to rewrite in an unrecorded area of the disk. In this case, if information about the recorded areas is previously recorded in a program memory area (PMA) 54 located inside the lead-in area or outside the lead-out area of the disk, this information can be referred to before rewriting to find the unrecorded capacity, the start address of rewriting, and so on. Furthermore, by using this recording method, it is possible to record on a rewritable disk, such as a DVD-RAM.

As has been explained, according to the first embodiment, by fixing a transfer rate of the compressed video data and by recording a plurality of fixed-length video title sets according to the recording time of a piece of work, it is possible to directly record on a WO disk or a rewritable disk without using an intermediate medium. In other words, video data taken by a video camera, for example, can be recorded directly on a recording medium, such as a DVD-R, in a format that can be played on a DVD video reproducing device without using an intermediate medium. It should be noted that with a DVD-R, like with a VTR (Video Tape Recorder) or a video-movie, it is possible to record TV programs or commemorative images on such occasions and play them back whenever one wishes.

Description will now be given of a second embodiment of the present invention.

In the first embodiment described above, because the video title sets have a fixed length (each video title set including one data cell), one scene may extend over two or more video title sets due to its recording time. In such a case, during playback on a DVD video player, a reproduced image may be unable to continue seamlessly over different video title sets.

In the second embodiment of the present invention, description will be given of a disk recording method, which makes it possible to record video data, such as those taken by a video camera, directly on a WO disk or a rewritable disk in a format reproducible on a DVD video player without using an intermediate medium, and also makes it possible to record one scene without discontinuity when it is reproduced.

The only difference from the DVD recording device in the first embodiment is that the DVD recording device in the second embodiment uses a controller 7' in place of the controller 7. In the other respects, the structure is the same as that in the first embodiment shown in FIGS. 1 and 2.

Figure 10:
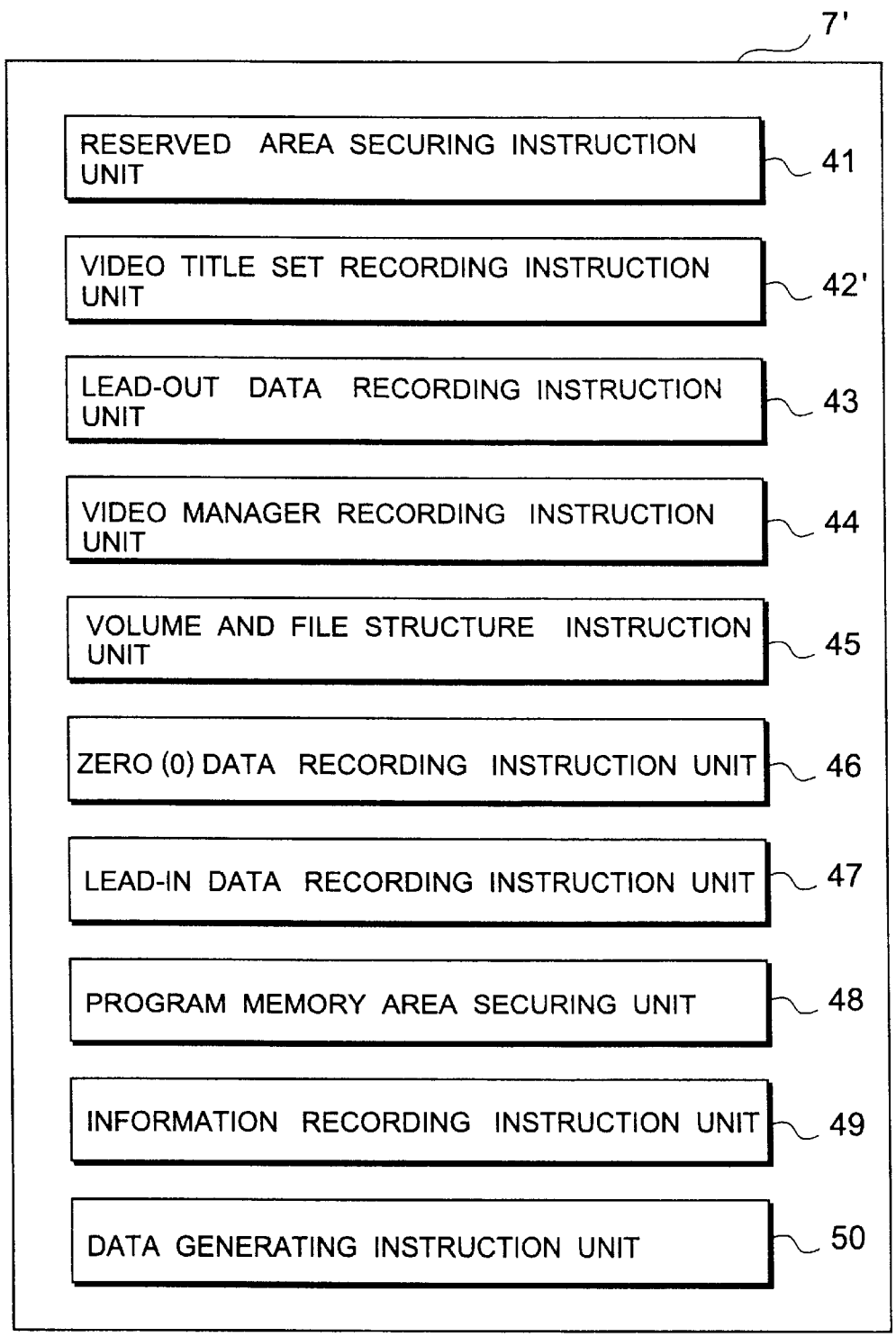
FIG. 10 is a schematic block diagram showing a structural example of the controller in a second embodiment of the present invention.

FIG. 10 is a schematic block diagram showing a structural example of the controller 7' in the DVD recording device, to which the second embodiment of the present invention is applied. In FIG. 10, those components, which have the same functions as those in the controller 7 in the first embodiment shown in FIG. 4, are designated by the same reference numerals, and their detailed descriptions are omitted.

In FIG. 10, the video title set recording instruction unit 42' instructs the data formatter 4 to convert, in conformity with the DVD Video Standard, content data compressed by the data compressor 2 and stored in the data storage 3 into at least one video title set #1 to #n, each including a video object set and video title set information descriptive of information for reproducing the video object set and attributes information, and also instructs the data recording unit 5 to sequentially record the video title sets #1 to #n obtained by the conversion in the area following the reserved area of the optical information recording medium 6.

In the second embodiment, the video title set recording instruction unit 42' is so arranged as to instruct the data recording unit 5 to record content data in each video title set in the form of a plurality of data cells, which are fixed-capacity subdivisions of the content data.

Figure 11:
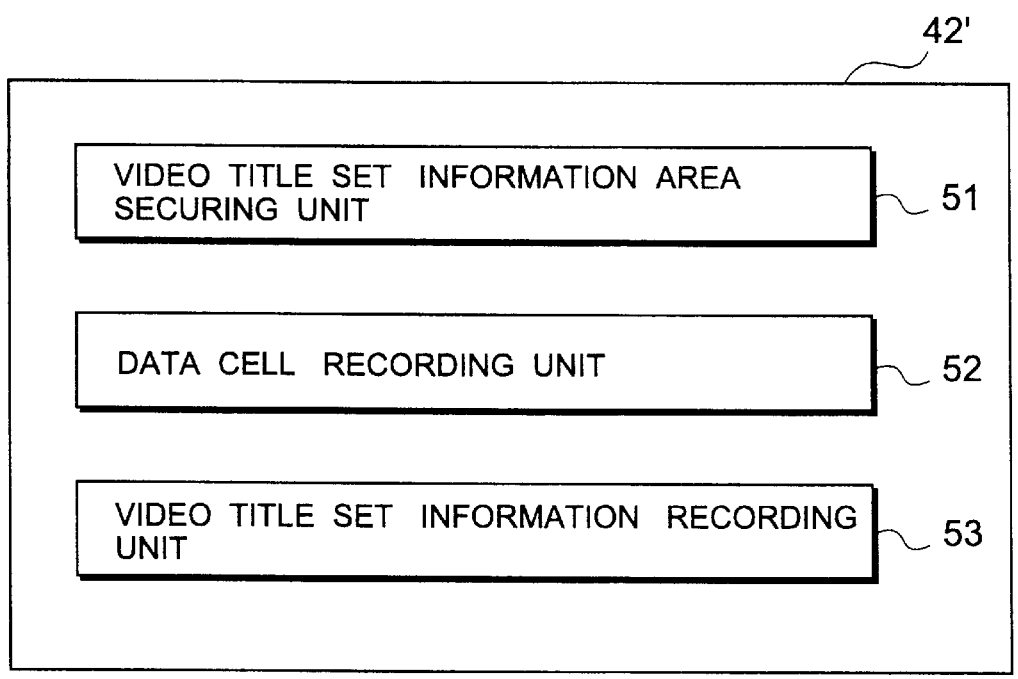
FIG. 11 is a schematic block diagram showing a structural example of the video title set recording instruction unit 42' in FIG. 10.

FIG. 11 is a schematic block diagram showing the structure of the video title set recording instruction unit 42' shown in FIG. 10.

In FIG. 11, a video title set information area securing unit 51, when one video title set is recorded, instructs the data recording unit 5 to secure a video title set information reserved area with a predetermined capacity in front of the area where the video title set is recorded.

A data cell recording unit 52 instructs the data formatter 4 and the data recording unit 5 to record at least one data cell placed in a predetermined capacity in an area subsequent to the video title set information reserved area.

A video title set information recording unit 53 instructs the data formatter 4 and the data recording unit 5 to record video title set information in the rear portion of the video title set information reserved area after the final data cell of each video title set has been recorded.

Figure 12:
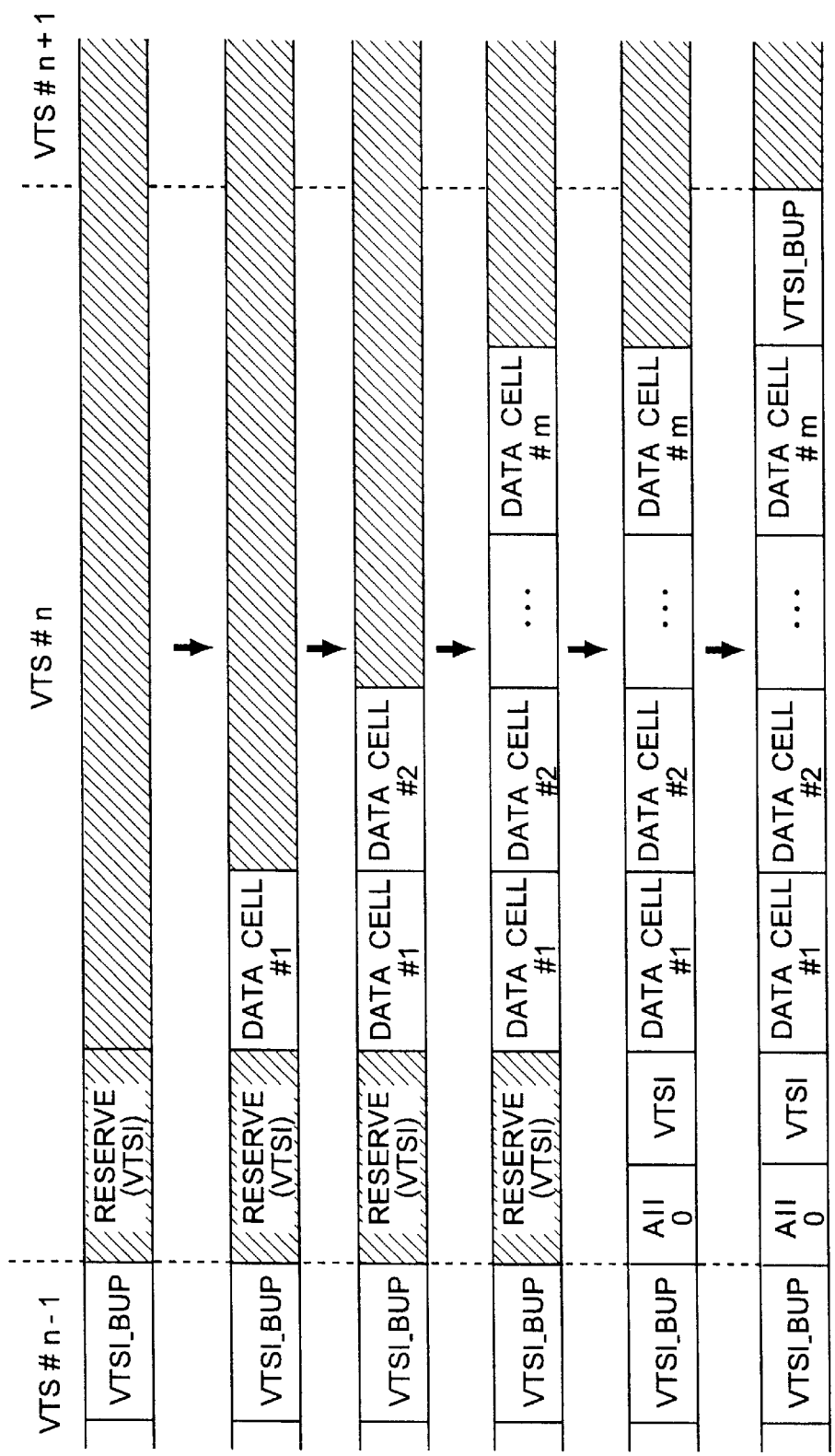
FIG. 12 is a diagram for explaining a procedure for recording on an optical information recording medium in the logical structure shown in FIG. 3, video data and audio data that can be reproduced on a DVD video reproducing device in the second embodiment of the present invention.
Figure 13:
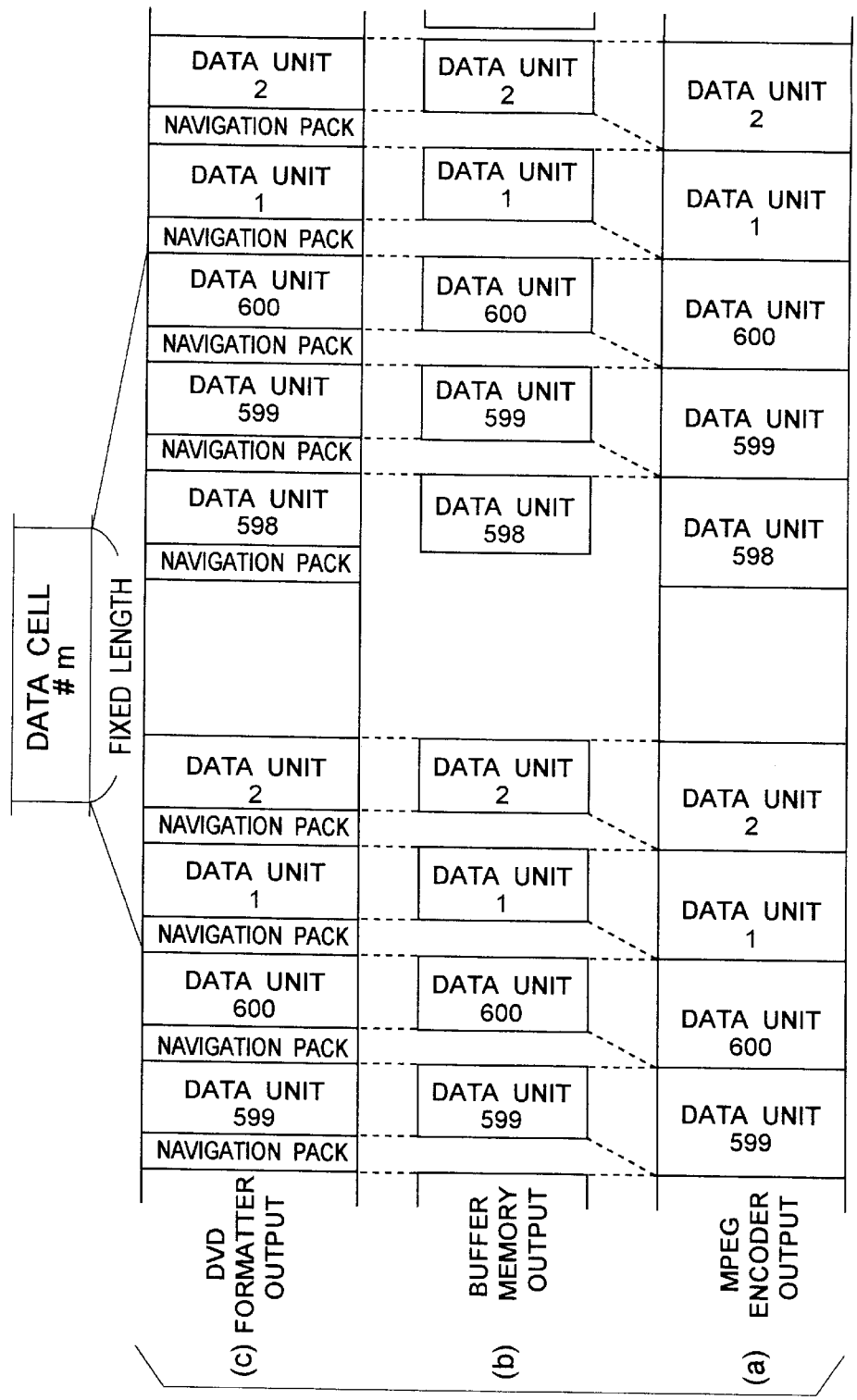
FIG. 13 is a diagram for explaining a procedure for recording on an optical information recording medium in the logical structure shown in FIG. 3, video data and audio data that can be reproduced on a DVD video reproducing device in the second embodiment of the present invention.
Figure 14:
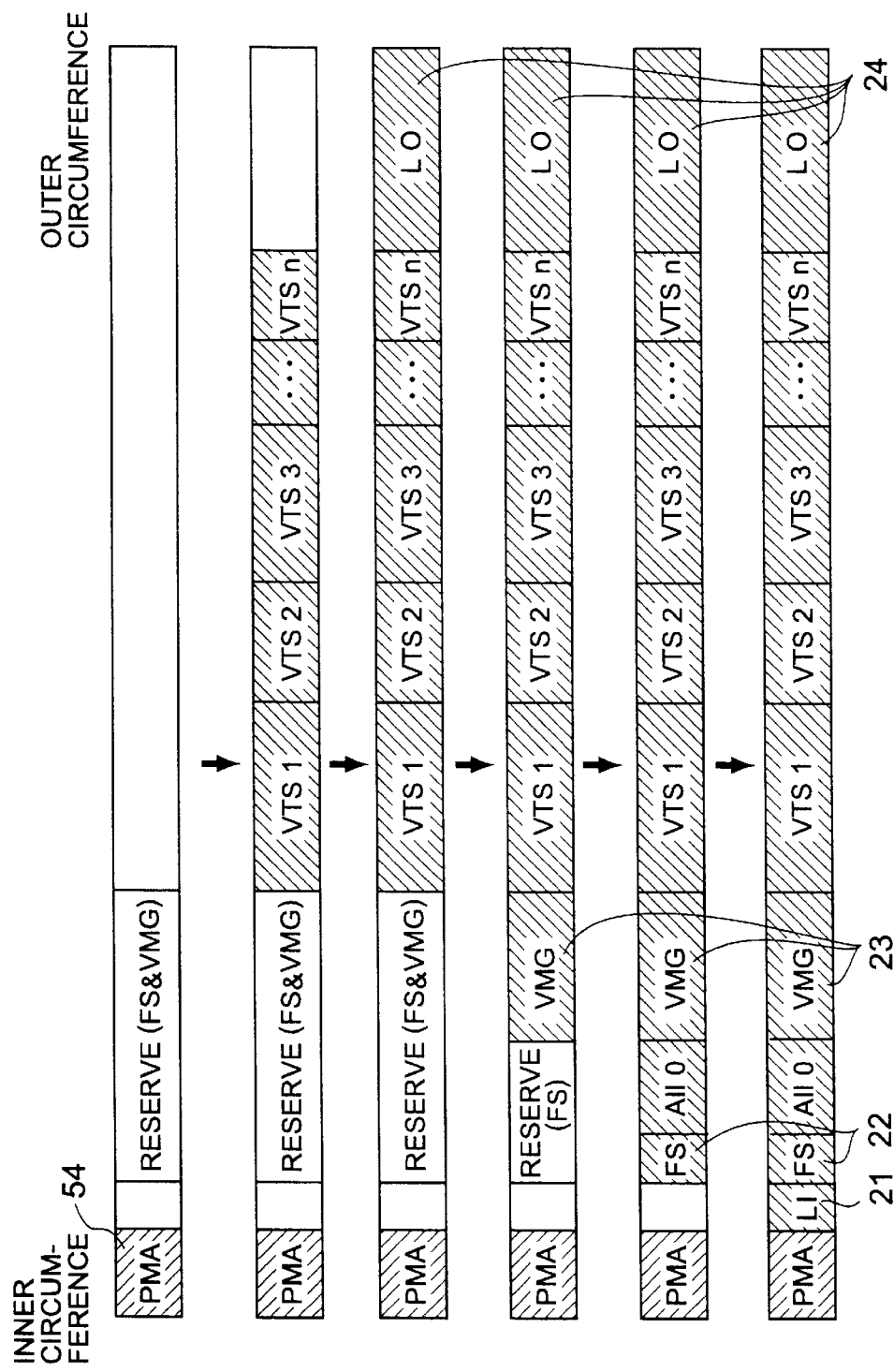
FIG. 14 is a diagram for explaining a procedure for recording on an optical information recording medium in the logical structure shown in FIG. 3, video data and audio data that can be reproduced on a DVD video reproducing device in the second embodiment of the present invention.

FIGS. 12 to 14 show diagrams for explaining a procedure for recording on an optical information recording medium 6 in a logical structure shown in FIG. 3, video and audio data in conformity with the DVD Video Standard, that is, data that can be reproduced on a DVD video reproducing device (DVD video player) in the second embodiment of the present invention.

In the second embodiment, description will be made of a procedure for recording video and audio data, reproducible on a DVD video player, on a WO (write once) disk as an optical information recording medium 6.

Before recording, a lead-in area 21 and a reserved area sufficient for recording volume and file structure data (FS) 22 and a video manager (VMG) 23, shown in FIG. 3, are secured on the WO disk in advance.

The capacity of the area to be secured is obtained in such a way as described below.

It is assumed that the total number n of video title sets (VTS) #1 to #n on the disk is 99 at maximum, and that there is one video manager 23 on the disk. It is also assumed that a video object set for video manager menu (VMGM_VOBS) and a video object set for video title set menu (VTSM_VOBS) are not recorded. In this case, it follows therefore that the video title sets #1 to #n each include three files and that the video manager 23 includes two files. Therefore, the total number of files that can be recorded on the disk is 299 as shown in Eq. 1 above. Because the largest number of files that can be recorded on a disk is known, it is possible to estimate a storage capacity required for recording the volume and file structure data 22 of the files.

The largest capacity of an area for recording a video manager 23 descriptive of the pointers and the attributes of the video title sets #1 to #n can be estimated from the largest number 99 of video title sets that can be recorded on the disk.

When a lead-in area 21 and a reserved area for recording the volume and file structure data 22 and the video manager 23 are secured as described, recording of video title sets #1 to #n is started immediately following the secured areas. At this time, in the procedure in FIG. 14, for all video title sets #1 to #n, the recording compression rate (amount of information for a unit time) of video and audio data is fixed (namely, a fixed transfer rate), and a capacity required for recording for a unit time is fixed. The number of data units included in each data cell is also fixed.

With the above arrangement, data pack reproduction information and navigation information (in brief, a navigation pack) descriptive of the relation with other data units in the same data cell, placed at the head of a data pack string of a data unit to be reproduced in a fixed time length, can be prepared (determined) in advance.

More specifically, video title set information 27 describes a program chain information (PGCI) that specifies, for example, a method for connecting to a program for reproducing the story of a title. It is assumed here that each video title set includes one program chain (PGC), each program chain includes not less than one program, and each program includes one data cell. The reproduction time (recording time) of each data cell is set to be 5 minutes in this example.

If the recording time of each data unit is fixed at 0.5 seconds (15 frames at field frequency of 60 Hz), the number of data units included in each data cell is 600 as shown in Eq. 2 above.

If one data unit is denoted as one GOP (Group of Pictures) as provided in MPEG2 and if the numbers of I-pictures (intra-coded pictures), P-pictures (predictive-coded pictures) and B-pictures (bi-directionally predictive-coded pictures) included in each GOP are fixed regardless of variation of input images, the data capacity (number of bytes) for each data unit can be made constant.

Under these conditions, recording of data on the WO disk is started. The DVD recording device, schematically shown in FIG. 2 and embodying the functional configurations indicated in FIGS. 1, 10 and 11, carries out recording by following the procedures as shown in FIGS. 12 to 14.

As shown in FIG. 12, the system microcomputer/timer 17 secures a reserved area sufficient for recording video title set information (VTSI) in front of the area for recording video title sets, to which this information is attached. The length of the VTSI reserved area can be obtained as follows.

Suppose that the length of recording images on one disk is 120 minutes. In this case, when the total of 120 minutes is used up by one recording, a video title set can take the maximum length. Also, the number of data cells (the recording time of a data cell is 5 minutes in the second embodiment) can be obtained as follows.

$$120 \div 5 = 24 \text{ data cells} \qquad \text{Eq.3}$$

The number of data units (the recording time of a data unit is 0.5 seconds in the second embodiment.) is as follows.

$$(120 \times 60) \div 0.5 = 14400 \text{ data units} \qquad \text{Eq. 4}$$

Therefore, the VTSI reserved area needs to be secured in a length sufficient for recording information about 24 data cells and 14400 data units.

Then, the MPEG encoder 12 compresses video data output from a video camera 10 or a VTR 11 at a fixed compression rate (1/70, for example).

FIG. 13(a) shows stream data (data units) compressed and output by the MPEG encoder 12. In a case of data cell #m, the MPEG encoder 12 outputs data units 1 to 600.

The stream data compressed and output as described is stored in the buffer memory 13. As shown in FIG. 13(b), the buffer memory 13 delays stream data output from the MPEG encoder 12 by a fixed length of time (0.004 seconds, for example), compresses the data on the time base, and outputs it to the DVD formatter 14. In the case of data cell #m, data units 1 to 600 are delayed by a fixed length of time, compressed on the time base, and output to the DVD formatter 14.

In the DVD formatter 14, as shown in FIG. 13(c), some items of navigation data are added to each data unit to convert it to data having a format that can be reproduced on a DVD video player. Therefore, the DVD formatter 14 outputs data units each added with a navigation pack. For example, in the case of data cell #m, the data units 1 to 600 as a whole, each added with a navigation pack, constitute one data cell.

Consequently, when the DVD formatter 14 outputs the data cell #m, for example, the data cell #m is recorded on a DVD-R by the cutting machine 15. If recording continues longer than 5 minutes from the start of recording of the current data cell #m, recording is concluded with the current data cell #m, and recording is restarted with the next data cell #m+1.

If recording of the current data cell ends within 5 minutes from when it started, the remaining portion of the disk is filled with black image data or a specific image data showing characters such as "No more information is recorded on this disk" until the reproduction time of the data cell amounts to 5 minutes.

When recording of data cells for one video title set has been finished, as shown in FIG. 12, video title set information (VTSI) is generated which corresponds to the length of recorded video data, and recorded in the above-mentioned VTSI reserved area. A backup of video title set information (VTSI_BUP) is recorded immediately following the finally recorded data cell #m.

When recording of the final video title set on the disk is finished, the finalizing step is performed on the disk.

In the finalizing step, as shown in FIG. 14, lead-out data (LO) 24 is recorded in the lead-out area, and a video manager 23 generated in accordance with the total number n of video title sets on the disk is recorded in the rear portion of the reserved area secured in advance. Then, volume and file structure data regarding all data recorded on the disk is recorded in the front portion of the reserved area. Subsequently, an intermediate area between the recorded area of the volume and file structure data 22 and the recorded area of the video manager 23 is filled (recorded) with zero data. Finally, lead-in data (LI) 21 corresponding to the capacity of data recorded on the disk is recorded in the lead-in area. Thus, a disk that can be played on a DVD video player is completed.

FIGS. 15 to 18 show a flowchart for explaining a detailed procedure for recording on an optical information recording medium 6, in a logical structure shown in FIG. 3, video and audio data in conformity with the DVD Video Standard, that is, data that can be reproduced on a DVD video reproducing device (DVD video player) in the second embodiment of the present invention. This flow of operations is performed by a DVD recording device, shown in FIG. 2, which embodies the functional configurations in FIGS. 1, 10, and 11.

In the operational flow shown in FIGS. 15 to 18, there is a setting such that one data cell takes 5 minutes and that a specific image data inserted in a data cell is black image data when recording of the data cell ends within 5 minutes of being started.

Figure 15:
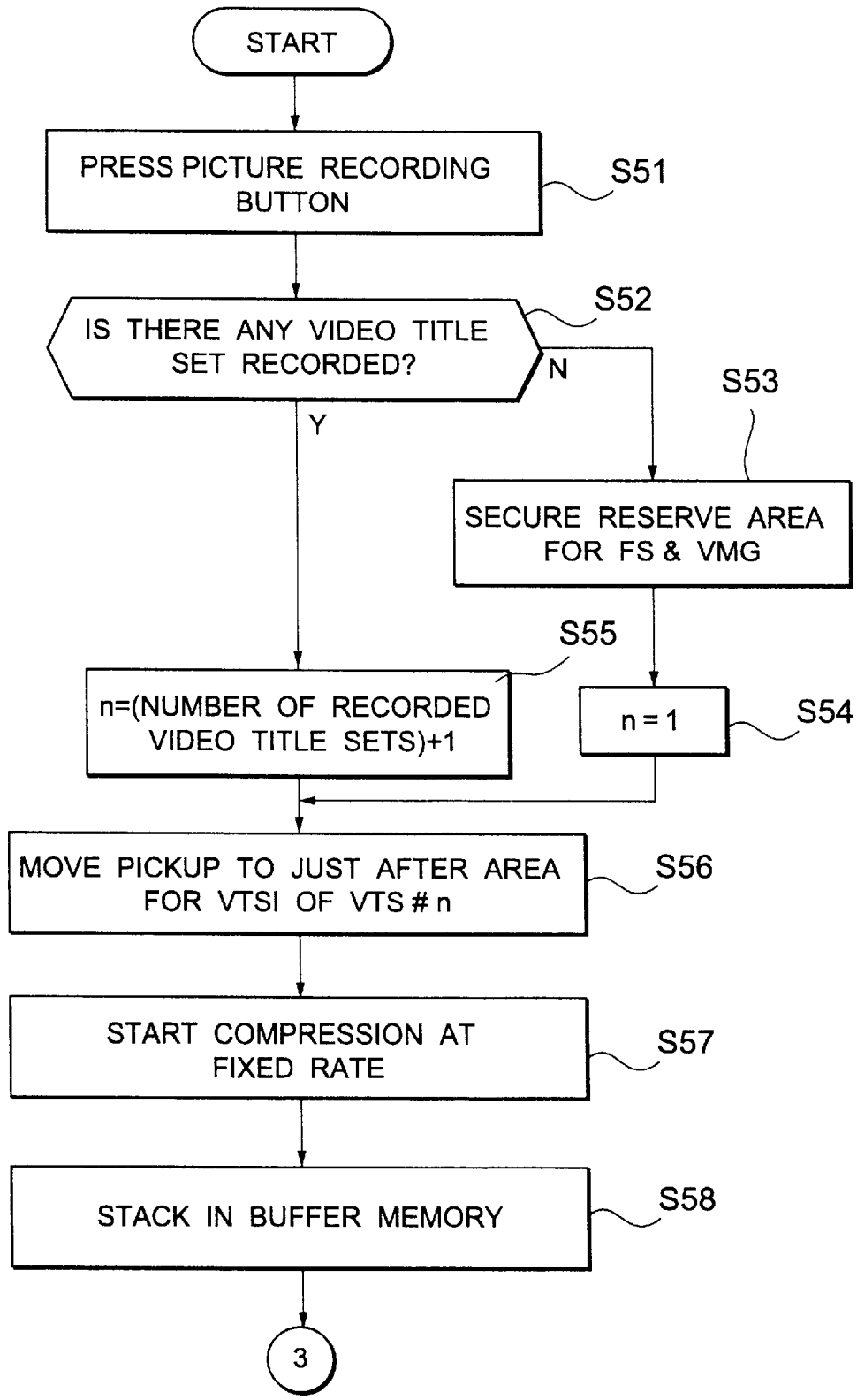
FIG. 15 is a flowchart for explaining a more detailed procedure for recording on an optical information recording medium in the logical structure shown in FIG. 3, video data and audio data that can be reproduced on a DVD video reproducing device in the second embodiment of the present invention.

In FIG. 15, when the Recording button on the key operation panel 18 is pressed (Step S51), the system microcomputer/timer 17 decides whether or not there is any video title set recorded on the disk (Step S52), and when no video title set has been recorded, secures a reserved area for recording volume and file structure data (FS) 22 and a video manager (VMG) 23 (Step S53), and then initializes the video title set number counter's value n to "1" (Step S54). On the other hand, if there are some recorded video title sets, the video title set number counter's value n is switched to the number of recorded video title sets+1 (Step S55).

After setting the video title set number counter's value n at Step S54 or S55, the system microcomputer/timer 17 causes the pickup of the cutting machine 15 to move to a location immediately following the VTSI reserved area secured in front of the area for recording the video title set #n indicated by the counter's value n (Step S56).

Subsequently, video data output from a video camera 10 or a VTR 11 is input to the MPEG encoder 12. In response, the MPEG encoder 12 starts compressing video data at a fixed rate (Step S57). The buffer memory 13 temporarily stores video data compressed by the MPEG encoder 12 (Step S58).

Figure 16:
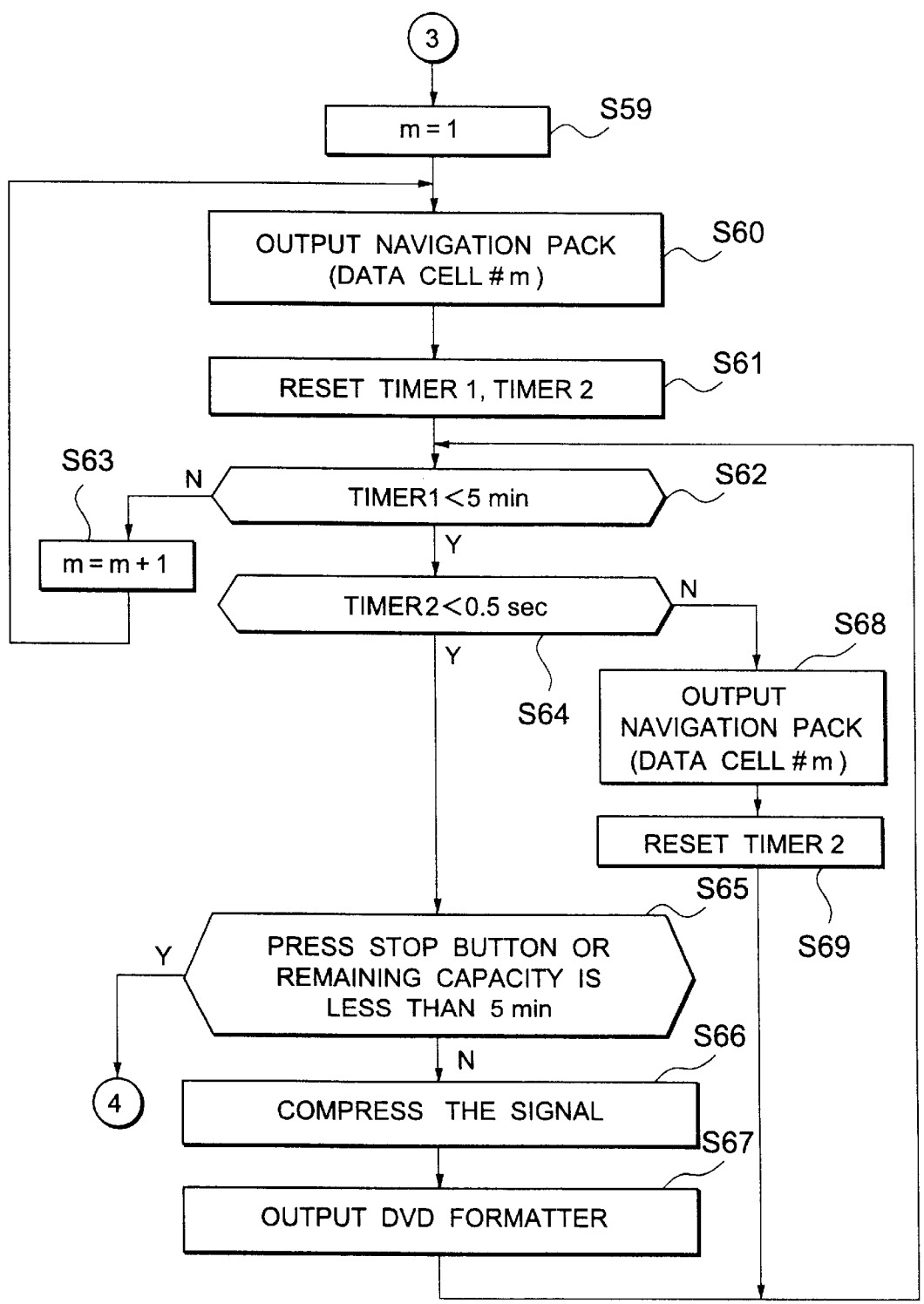
FIG. 16 is a flowchart for explaining a more detailed procedure for recording on an optical information recording medium in the logical structure shown in FIG. 3, video data and audio data that can be reproduced on a DVD video reproducing device in the second embodiment of the present invention.

In FIG. 16, when buffer memory 13 stores content data compressed by the MPEG encoder 12, the system microcomputer/timer 17 initializes the data cell number counter's value m to "1" (Step S59).

Then, the DVD formatter 14, responding to a command from the system microcomputer/timer 17, adds navigation data to content data stored in the buffer memory 13, and starts converting the data into data having a format in conformity with the DVD Video Standard. The DVD formatter 14 outputs a navigation pack to add to the initial data unit of data cell #m (Step S60). The cutting machine 15 records this data on the disk.

Then, the system microcomputer/timer 17 resets a timer 1 for counting passage of 5 minutes and a timer 2 for counting passage of 0.5 seconds, and causes those timers to start counting (Step S61).

Then, the system microcomputer/timer 17 decides whether or not the timer 1 has counted passage of 5 minutes (Step S62). If the timer 1 has counted passage of 5 minutes, this is notified to the DVD formatter 14. In response, the DVD formatter 14 increments the counter's value m by one (Step S63), and returns to Step S60.

On the other hand, at Step S62, if the timer 1 has not counted the passage of 5 minutes, the system microcomputer/timer 17 decides whether or not the timer 2 has counted the passage of 0.5 seconds (Step S64). If the timer 2 has counted the passage of 0.5 seconds, this is notified to the DVD formatter 14. In response, the DVD formatter 14 outputs a navigation pack to be added to a data unit next to the recorded data unit out of the data units constituting the data cell #m (Step S68). After this, the system microcomputer/timer 17 resets the timer 2 (Step S69), and returns to Step S62. The cutting machine 15 records this navigation pack subsequent to the recorded data unit.

At Step S64, if the timer 2 has not counted the passage of 0.5 seconds, the system microcomputer/timer 17 decides whether or not the Stop button on the key operation panel 18 has been pressed, and decides whether or not the remaining capacity of the disk is smaller than a recording capacity corresponding to 5 minutes (Step S65). If the Stop button has not been pressed and the remaining capacity of the disk is greater than a recording capacity corresponding to 5 minutes, the DVD formatter 14 compresses the content stored in the buffer memory 13 on the time base and outputs the signal to the cutting machine 15 from the buffer memory 13 (Step S66). In response, the cutting machine 15 records this content data as a data unit next to the navigation pack already recorded (Step S67), and the process returns to Step S62.

Figure 17:
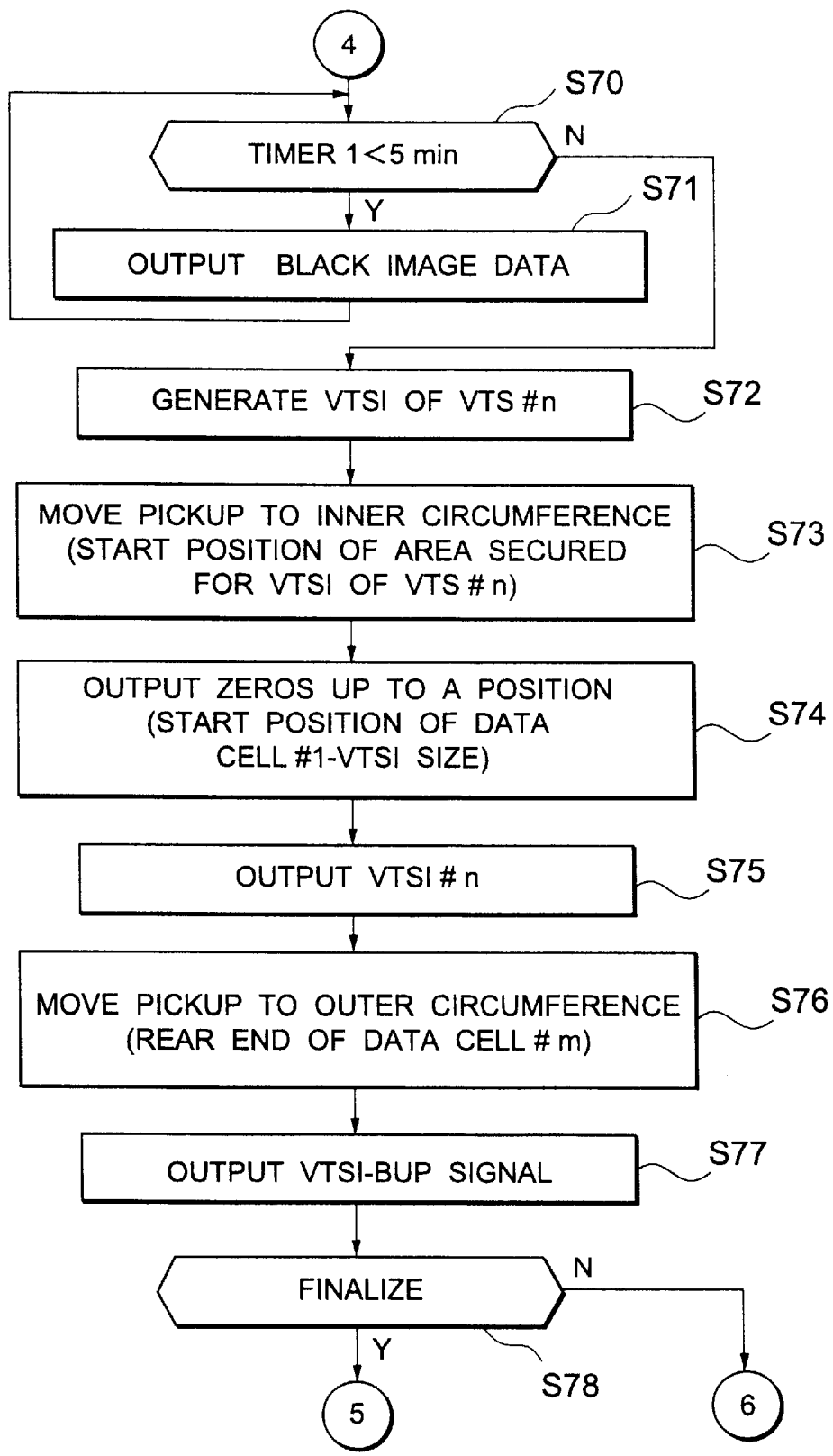
FIG. 17 is a flowchart for explaining a more detailed procedure for recording on an optical information recording medium in the logical structure shown in FIG. 3, video data and audio data that can be reproduced on a DVD video reproducing device in the second embodiment of the present invention.

When the system microcomputer/timer 17 at Step S65 decides that the Stop button has been pressed or the remaining capacity of the disk is smaller than a recording capacity corresponding to 5 minutes, the system microcomputer/timer 17 moves on to the flow of FIG. 17 and decides whether or not the timer 1 has counted the passage of 5 minutes (Step S70). If the timer 1 has not counted the passage of 5 minutes, the DVD formatter 14 outputs black image data (Step S71). The cutting machine 15 records the black image data as the rest of the data unit being recorded.

At Step S70, the above operation is repeated until the timer 1 counts the passage of 5 minutes. When the timer 1 has counted the passage of 5 minutes, the system microcomputer/timer 17 notifies this to the DVD formatter 14. In response, the DVD formatter 14 generates video title set information (VTSI) of video title set #n (Step S72). The system microcomputer/timer 17 causes the pickup of the cutting machine 15 to move to the start position of the VTSI reserved area already secured in front of the recorded area of video title set #n (Step S73). Then, the DVD formatter 14 outputs zero data during the time the pickup of the cutting machine 15 moves from the head position of the VTSI reserved area to a position further inward, by the size of an area required for recording the video title set information of video title set #n, than the start position of recording the initial data cell #1 of video title set #n (Step S74). The DVD formatter 14 outputs the video title set information of video title set #n (Step S75). Therefore, it follows that the video title set information is recorded in the rear portion of the VTSI reserved area and zero data is recorded in its front portion (remaining portion).

The system microcomputer/timer 17 causes the pickup of the cutting machine 15 to move to the rear end of that area of video title set #n where the final data cell #m was recorded (Step S76). Then, in response to a command of the system microcomputer/timer 17, the DVD formatter 14 outputs a backup of the video title set information of video title set #n (Step S77). The cutting machine 15 records this data subsequent to the final data unit of video title set #n.

Subsequently, the system microcomputer/timer 17 decides whether or not to perform the finalizing step (Step S78). More specifically, this is decided by finding whether or not the remaining capacity of the disk is larger than a recording capacity corresponding to 5 minutes or by knowing whether or not a command to perform the finalizing step has been input from the key operation panel 18 by an operator.

Figure 18:
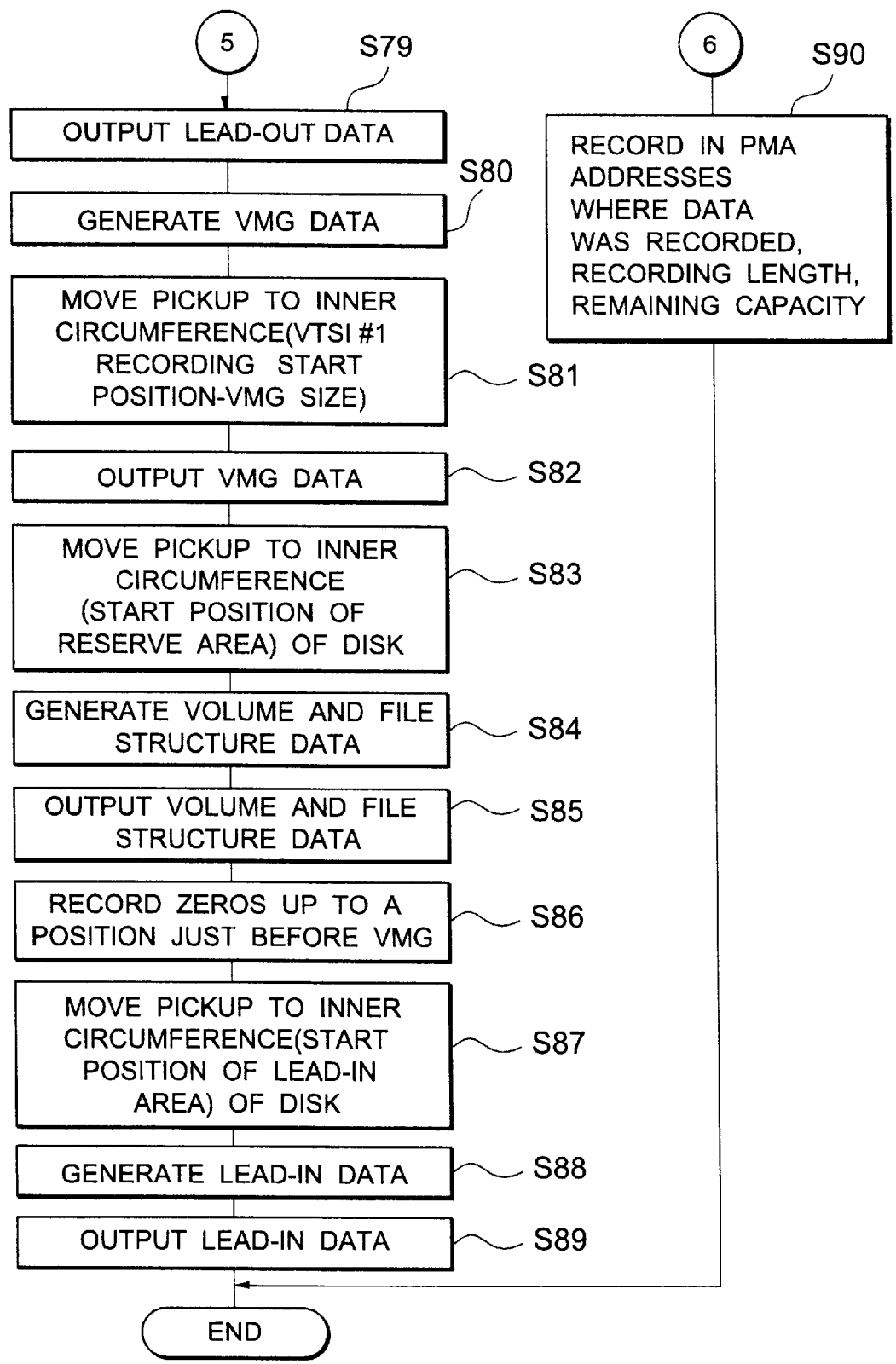
FIG. 18 is a flowchart for explaining a more detailed procedure for recording on an optical information recording medium in the logical structure shown in FIG. 3, video data and audio data that can be reproduced on a DVD video reproducing device in the second embodiment of the present invention.
Figure 19:
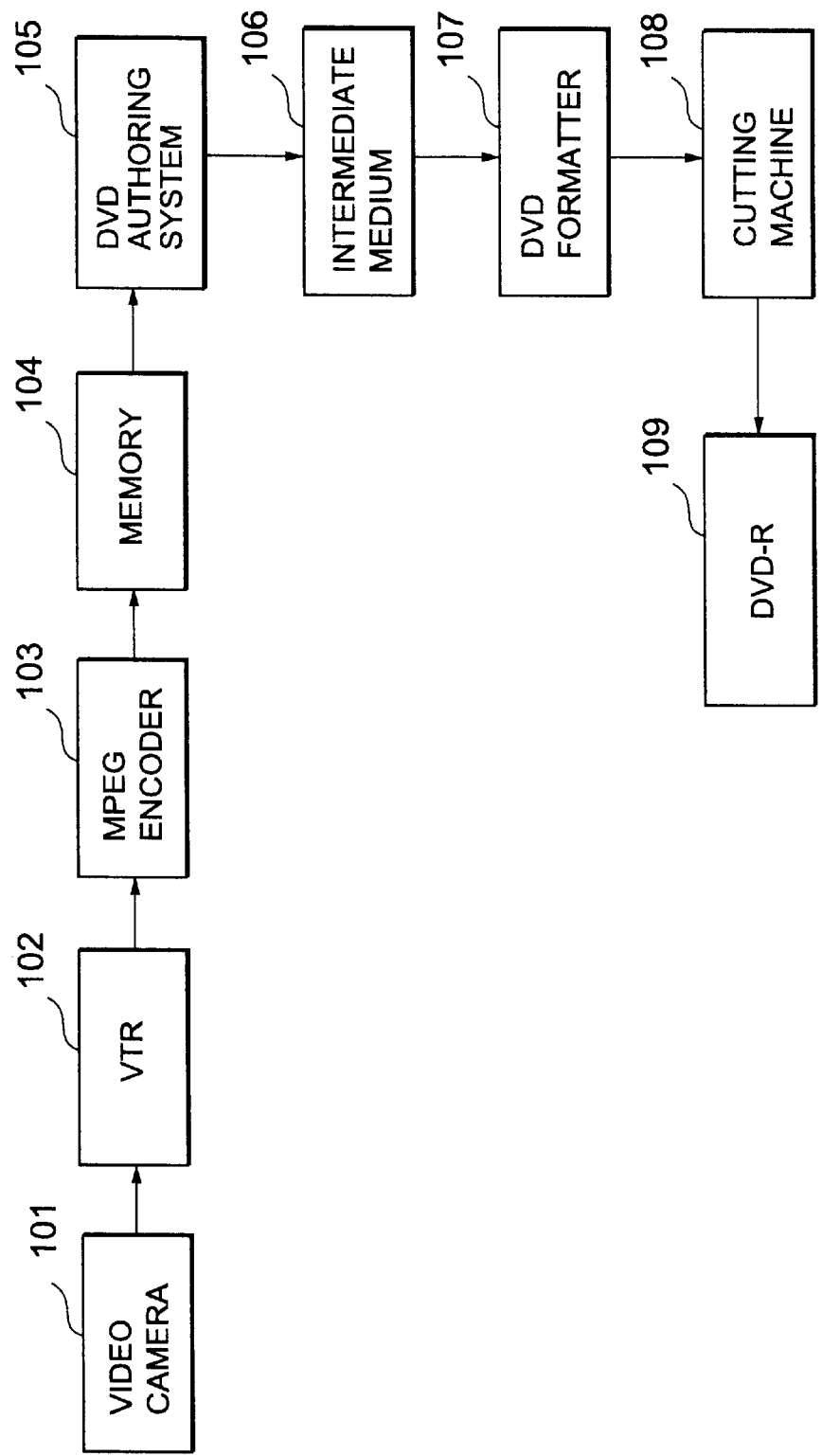
FIG. 19 is a schematic block diagram of the conventional DVD recording device.

When the finalizing step is not performed, the process proceeds to Step S90 in FIG. 18, the system microcomputer/timer 17 instructs the DVD formatter 14 and the cutting machine 15 to record the addresses where recording was done this time, recording length, remaining capacity, and so on in the program memory area (PMA) 54.

On the other hand, when the finalizing step is performed, this is notified to the DVD formatter 14. In response, the DVD formatter 14 returns to Step S79 in FIG. 18, and outputs lead-out data (Step S79). The cutting machine 15 records this data subsequent to the final data unit of video title set #n.

Then, the DVD formatter 14 generates a video manager (Step S80).

Then, the system microcomputer/timer 17 causes the pickup of the cutting machine 15 to move to the inner circumference portion of the disk (Step S81). In other words, the pickup is moved to a position (in the rear portion of the reserved area) distant by the length of the video manager from the recording start position of video title set information (VTSI) of video title set #1. The cutting machine 15 outputs the video manager from its pickup (Step S82), and records the video manager in the rear portion of the reserved area secured in advance.

Then, the system microcomputer/timer 17 causes the pickup of the cutting machine 15 to move to the inner circumference portion of the disk and further to move to the start position of the reserved area secured in advance (Step S83).

At this time, the DVD formatter 14 generates volume and file structure data (Step S84). The cutting machine 15 records the volume and file structure data in the front portion of the reserved area secured in advance (Step S85). After this, the cutting machine 15 records zero (0) data up to immediately in front of the video manager recorded previously (Step S86). Thus, the intermediate area between the front portion of the reserved area where the volume and file structure data was recorded and the rear portion where the video manager was recorded is filled with zero data.

Then, the system microcomputer/timer 17 causes the pickup of the cutting machine 15 to move to the inner circumference portion of the disk and further to move to the start position of the lead-in area (Step S87). At this time, the DVD formatter 14 generates lead-in data (Step S88), and the cutting machine 15 records the lead-in data in the lead-in area (Step S89).

With the above process, when the optical information recording medium 6 is a WO disk, video data and audio data that can be reproduced on a DVD video player can be recorded directly on the WO disk.

The second embodiment of the present invention has been described.

In the disk recording method according to the second embodiment, a reserved area is previously secured following the lead-in area of the WO disk. Then, content data compressed at a fixed compression rate is divided into data cells #1 to #m each with a predetermined data length (a length corresponding to a recording time of 5 minutes in this example), and they are put together as a video title set and this video title set is recorded in the area subsequent to the reserved area on the WO disk. After the video title set has been recorded, lead-out data of the WO disk is recorded in the lead-out area, then the video manager is recorded in the rear portion of the reserved area secured previously, and volume and file structure data is recorded in the front portion of the reserved area. Finally, lead-in data is recorded in the lead-in area.

At this time, a plurality of data units, each data unit reproduced in a fixed time (0.5 seconds in this example), being generated by a single recording, and a plurality of data cells, each data cell including a plurality of data units and being reproduced in a fixed time (5 minutes in this example), are generated by a single recording. A plurality of data cells generated by a single recording are recorded as one video title set on the disk.

Information, such as the addresses where recording was carried out, recording length, and remaining capacity, is recorded in the program memory area provided inside the lead-in area or outside the lead-out area. After the final video title set has been recorded on the disk, by referring to the information recorded in the program memory area, data such as a video manager, volume and file structure data, and lead-in data are generated and recorded in the specified areas on the disk.

More specifically, in the second embodiment, the reserved area is previously secured behind the lead-in area on a WO disk. Content data compressed at a fixed compression rate is recorded as one video title set, including 5-minute-long data cells, by a single recording, which starts from immediately behind the reserved area. At this time, information, such as the addresses where recording carried out this time, recording length, and remaining capacity, is recorded in the program memory area. The number of video title sets is increased to 99 at maximum according to the number of times of recording (writing) of content data. After all of the content data has been recorded, the lead-out data is recorded at the outer circumference portion of the disk. Then, by referring to information recorded in the program memory area, a video manager is generated in accordance with the number of video title sets, and is recorded in the rear portion of the reserved area. Similarly, the volume and file structure data is generated, recorded in a management area (the front portion of the reserved area) provided in Micro UDF and ISO9660, and the rest of the reserved area is filled with the zero data. Finally, lead-in data according to the length (capacity) of the program area, is generated and is recorded in the lead-in area, and thus, a recorded disk that can be played on a DVD video player is completed.

As has been described, according to the second embodiment, the transfer rate of compressed video data is fixed, a plurality of data cells of fixed length are generated according to recording time, and by recording the data cells as one video title set, the video signal can be recorded directly on a WO disk or a rewritable disk without using an intermediate medium. In other words, for example, pictures taken by a video camera can be recorded directly on a recording medium, such as a DVD-R, in a format reproducible on a DVD reproducing device without using an intermediate medium. Because arrangement has been made for one video title set to be recorded by a single recording operation, a scene can be recorded without discontinuity when it is reproduced.

According to the present invention, video data taken by a video camera, for example, can be recorded directly on an optical information recording medium, such as a DVD-R, in a format reproducible on a DVD reproducing device.

What is claimed is:

1. A DVD recorder for recording content data including any of a main video signal, a sub picture signal, and an audio signal on an optical information recording medium in a recording format in conformity with the DVD Video Standard, said DVD recorder comprising:

data compression means for compressing said content data at a fixed data compression rate;

data formatting means for adding reproduction information for the content data and navigation data showing the relation with other content data to the content data, and converting the content data compressed by said data compression means into data having a format in conformity with the DVD Video Standard;

data recording means for recording on the optical information recording medium said content data converted into data having a format in conformity with the DVD Video Standard by said data formatting means; and control means for centrally controlling the respective means, wherein said control means includes:

reserved area securing instruction means for instructing said data recording means to secure a reserved area having a predetermined capacity on said optical information recording medium;

video title set recording instruction means for instructing said data formatting means to convert the content data compressed by said data compression means into at least one video title set, including a video object set and video title set information describing information for reproducing the video object set and describing attribute information, and also for instructing said data recording means to sequentially record at least one video title set, obtained by conversion, in an area following said reserved area on the optical information recording medium;

video manager recording instruction means for instructing said data formatting means to generate a video manager for managing the video title sets recorded on said optical information recording medium in accordance with the DVD Video Standard, and also for instructing said data recording means to record the video manager in a rear portion of said reserved area after the video title sets have been recorded on the optical information recording medium as instructed by said video title set recording instruction means; and volume and file structure data recording instruction means for instructing said data formatting means to generate volume and file structure data as information for managing contents on said optical information recording medium as files and directories in accordance with the DVD Video Standard, and also for instructing said data recording means to record the volume and file structure data in a front portion of said reserved area after said video manager has been recorded on the optical information recording medium as instructed by said video manager recording instruction means.

2. A DVD recorder according to claim 1, wherein said video title set recording instruction means instructs said data formatting means to convert the content data compressed by said data compression means into at least one video title set having a predetermined capacity, and also instructs said data recording means to sequentially record at least one video title set, obtained by the conversion, in an area subsequent to said reserved area of said optical information recording medium.

3. A DVD recorder according to claim 2, wherein said video title set recording instruction means instructs said data recording means to record the content data in one video title set as one data cell.

4. A DVD recorder according to claim 1, wherein said video title set recording instruction means includes:

a video title set information area securing means which, when one video title set is recorded, instructs said data recording means to secure a video title set information reserve area with a predetermined capacity in front portion of an area where the video title set is recorded;

a data cell recording means which instructs said data recording means to record at least one data cell having a predetermined capacity in an area subsequent to the video title set information reserved area; and a video title set information recording means which instructs said data recording means to record video title set information in said video title set information reserved area after data cells have been recorded by said data recording means.

5. A DVD recorder according to claim 4, wherein said video title set recording instruction means instructs said data recording means to record a video title set with a plurality of data cells, each having a predetermined capacity, included therein.

6. A DVD recorder according to claim 1, wherein said control means further includes:

lead-out data recording instruction means for instructing said data formatting means to generate lead-out data in accordance with the DVD Video Standard, and also for instructing said data recording means to record the lead-out data in a lead-out area following the recorded area of the video title set on the optical information recording medium after video title sets have been recorded on the optical information recording medium as instructed by said video title set recording instruction means and before said video manager recording instruction means starts recording a video manager on the optical information recording medium;

zero data recording instruction means for instructing said data formatting means and said data recording means to record zero data between a front portion of said reserved area on the optical information recording medium where volume and file structure data was recorded and a rear portion of said reserved area where said video manager was recorded after the volume and file structure data has been recorded on the optical information recording medium as instructed by said volume and file structure data recording instruction means; and lead-in data recording instruction means for instructing said data formatting means to generate lead-in data in accordance with the DVD Video Standard, and also for instructing said data recording means to record the lead-in data in the lead-in area on the optical information recording medium after zero data has been recorded on the optical information recording medium as instructed by said zero data recording instruction means.

7. A DVD recorder according to claim 6, wherein said control means further includes:

program memory area securing means to instruct said data recording means to secure a program memory area at a location further in than the lead-in area or at a location further out than the lead-out area;

information recording instruction means for instructing said data recording means to record information about the video title set in said program memory area each time a video title set has been recorded; and data generating instruction means for instructing said data formatting means to generate the volume and file structure data and the lead-in data by referring to information recorded in said program memory area after a final video title set has been recorded.

8. A DVD recorder according to claim 1, wherein said reserved area securing instruction means instructs said data recording means to secure said reserved area subsequent to the lead-in area of said optical information recording medium.

9. A method of recording content data including any of a main video signal, a sub video signal, and an audio signal on an optical information recording medium in a recording format in conformity with the DVD Video Standard, said recording method comprising the steps of:

securing a reserved area having a predetermined capacity in an area subsequent to a lead-in area of said optical information recording medium;

converting said content data into at least one video title set having a predetermined capacity, and sequentially recording at least one video title set in an area subsequent to said reserved area of said optical information recording medium;

generating a video manager for managing the video title sets recorded on said optical information recording medium after said video title sets have been recorded on said optical information recording medium, and recording said video manager in a rear portion of said reserved area of said optical information recording medium; and generating volume and file structure data for managing contents recorded on said optical information recording medium after said video manager has been recorded on said optical information recording medium, and recording the volume and file structure data in a front portion of said reserved area.

10. A recording method according to claim 9, wherein said content data in one video title set is recorded as one data cell.

11. A method of recording content data including any of a main video signal, a sub video signal, and an audio signal on an optical information recording medium in a recording format in conformity with the DVD Video Standard, said recording method comprising the steps of:

securing a reserved area having a predetermined capacity in an area subsequent to a lead-in area of said optical information recording medium;

dividing said content data compressed at a fixed compression rate into at least one data cell having a predetermined capacity, and recording a video title set, including said at least one data cell in an area subsequent to said reserved area of said optical information recording medium;

generating a video manager for managing the video title sets recorded on said optical information recording medium after said video title sets have been recorded on said optical information recording medium, and recording said video manager in a rear portion of the reserved area of the optical information recording medium; and generating volume and file structure data for managing contents recorded on said optical information recording medium after said video manager has been recorded on said optical information recording medium, and recording the volume and file structure data in a front portion of said reserved area, wherein said step of recording said video title set in an area subsequent to said reserved area, includes the steps of:

previously securing a video title set information reserved area for recording video title set information included in said video title set in front of the area where the video title set is recorded;

recording a video object set included in said video title set in the area, where said video title sets are recorded, subsequent to the video title set information reserved area; and recording video title set information of the video title sets in said video title set information reserved area after the video title sets have been recorded on said optical information recording medium.

12. A recording method according to claim 11, wherein said content data in one data cell is recorded as at least one data unit of a fixed length.

* * * * *